United States Patent
McMichael

(10) Patent No.: US 10,482,504 B2
(45) Date of Patent: Nov. 19, 2019

(54) SYSTEMS AND METHODS FOR ANALYZING INPUT DATA AND PRESENTING INFORMATION

(71) Applicant: William McMichael, Warwick, NY (US)

(72) Inventor: William McMichael, Warwick, NY (US)

(*) Notice: Subject to any disclaimer, the term of this patent is extended or adjusted under 35 U.S.C. 154(b) by 0 days.

(21) Appl. No.: 16/112,417

(22) Filed: Aug. 24, 2018

(65) Prior Publication Data

US 2019/0066156 A1 Feb. 28, 2019

Related U.S. Application Data

(60) Provisional application No. 62/549,834, filed on Aug. 24, 2017.

(51) Int. Cl.
G06Q 30/02 (2012.01)

(52) U.S. Cl.
CPC ..... *G06Q 30/0256* (2013.01); *G06Q 30/0224* (2013.01); *G06Q 30/0267* (2013.01); *G06Q 30/0275* (2013.01)

(58) Field of Classification Search
CPC .................................................. G06Q 30/20
See application file for complete search history.

(56) References Cited

U.S. PATENT DOCUMENTS

| | | |
|---|---|---|
| 7,707,226 B1 | 4/2010 | Tonse |
| 8,849,931 B2 | 9/2014 | Linner et al. |
| 9,031,216 B1 | 5/2015 | Kamvar et al. |
| 2006/0136298 A1* | 6/2006 | Klein ............... G06Q 30/02 705/14.54 |
| 2007/0038614 A1* | 2/2007 | Guha ............... G06Q 30/02 |
| 2007/0050389 A1* | 3/2007 | Kim ............... G06Q 30/02 |
| 2007/0088687 A1 | 4/2007 | Bromm et al. |
| 2008/0104026 A1* | 5/2008 | Koran ............ G06F 17/30867 |
| 2009/0076917 A1 | 3/2009 | Jablokov et al. |
| 2009/0216710 A1* | 8/2009 | Chang ............ G06F 17/30672 |
| 2010/0205061 A1* | 8/2010 | Karmarkar ......... G06Q 30/02 705/14.64 |
| 2011/0055005 A1* | 3/2011 | Lang ............... G06Q 30/02 705/14.45 |
| 2013/0297317 A1 | 11/2013 | Lee et al. |
| 2014/0188806 A1* | 7/2014 | Buchheit ........... G06Q 10/107 707/646 |
| 2014/0373050 A1* | 12/2014 | Sharan ............ G06Q 30/02 725/34 |
| 2015/0178388 A1* | 6/2015 | Winnemoeller .. G06F 17/30864 707/722 |
| 2016/0225010 A1* | 8/2016 | Patel ............... G06Q 20/325 |

(Continued)

*Primary Examiner* — Vincent M Cao

(74) *Attorney, Agent, or Firm* — Weber Rosselli & Cannon LLP

(57) ABSTRACT

Disclosed are systems and methods for displaying situationally appropriate data in response to receiving input on a mobile device. The methods may include receiving a first input in an application executed on a mobile device at a directed message server, analyzing the first input for generating a search query, generating the search query based on the first input, transmitting the search query to at least one content server, receiving situationally relevant data from the at least one content server, and transmitting the situationally appropriate data to the mobile device.

20 Claims, 17 Drawing Sheets

(56) References Cited

U.S. PATENT DOCUMENTS

| | | | | |
|---|---|---|---|---|
| 2017/0102871 A1* | 4/2017 | Won | ...................... | G06F 3/0481 |
| 2017/0308291 A1* | 10/2017 | Luipold | ............ | G06F 17/30864 |
| 2017/0308292 A1* | 10/2017 | Choi | ................... | G06F 3/04842 |
| 2018/0025382 A1 | 1/2018 | Moore et al. | | |

* cited by examiner

Merchant: Amazon
Start Date: 2017-01-24
End Date: 2050-12-31

Category: Food & Gourmet, Food & Beverage, Online Grocery

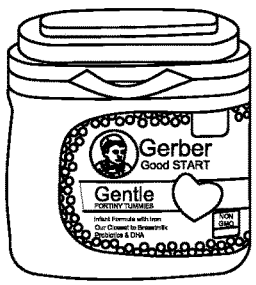

20% off Gerber Good Start Subscribe and Save Coupon.

Value (example: 20% Off):
Label:
Advertiser or Source: Amazon.com

Zone: 45 - App Logo Expandable 75x4049 - App Logo Expandable 75x40 - zip code test50 - DEMO - App Logo Expandable 75x4055 - Investor Test Group

Banner Name: _____

Banner Baseline Image Logo:

Option 1 - Select Brand Logo: -- select brand logo
 --amazon_logo.gif

Option 2 - Upload Brand Logo
(75px width / 40px height)

Suggested Keywords Targeting:

gerber baby formula formula gerber good start infant formula good start

Target Keywords: _____

(use spaces to separate keywords)

905 —[Publish] Cancel [Delete] — 910

FIG. 9

SYSTEMS AND METHODS FOR ANALYZING INPUT DATA AND PRESENTING INFORMATION

CROSS-REFERENCE TO RELATED APPLICATIONS

This application claims the benefit of, and priority to, U.S. Provisional Patent Application No. 62/549,834 filed on Aug. 24, 2017, titled "Systems and Methods for Analyzing Instant Message Information and Presenting Information", the entire contents of which are herein incorporated by reference for all purposes.

BACKGROUND

Techniques for transmitting or pushing relevant data to mobile devices are often employed to provide informational updates to individuals. These updates are often transmitted to mobile devices or "pushed" while the individuals are interacting with the mobile devices. Interaction may include direct interaction (e.g., inputting information via one or more input sensors or devices for use with an application running on the mobile device) or indirect interaction (e.g., using a mobile device to measure the path traveled by individuals running along a course). Information pushed to these mobile devices may include information relevant to the either the direct interaction (e.g., search results) or the indirect interaction (e.g., geographically relevant information, activity-specific information, and the like).

Expedient and efficient translation of information to and from such mobile devices, and specifically to end users interacting with such mobile devices, has increasingly become the focus of mobile device and application developers. Due to the ease with which advances in device technology allow individuals to access mobile devices, and by extension information retrievable with the aid of such mobile devices, the need to transmit situationally appropriate information to such devices remains relevant.

Generally, there are two methods for transmitting situationally appropriate data to a mobile device. The first method is to provide mobile applications to be executed on mobile devices, without charge, and push data (advertisements, proximity notifications, etc.) to the application for subsequent display on the mobile devices. The second method is to sell an application configured to selectively push situationally appropriate data to the device.

Situationally appropriate data transmitted for display in either the first or second method often leads to the display of the situationally appropriate information, either intentionally or unintentionally, while obscuring the primary content of the content displayed by the application on the mobile device. In response, the display of situationally appropriate information may increase the time necessary for individuals to review the information, or may be dismissed prior to review by the individual in favor of other content. Accordingly, there is a need for methods and systems which improve upon methods of transmitting and displaying situationally appropriate information on mobile devices.

SUMMARY

In one aspect, the present disclosure features a method of displaying situationally appropriate data in response to receiving input on a mobile device. The method includes receiving, at a server, a first input to an application executed on a mobile device; analyzing, by the server, the first input for generating a search query; generating, by the server, the search query based on the first input; transmitting the search query to at least one content server; receiving, at the server, situationally relevant data; and transmitting the situationally relevant data to the mobile device.

In another aspect, the present disclosure features a method of displaying advertisement data in response to receiving text input on a mobile device. The method includes detecting text input at a text input field of a communications application executed on a mobile device, analyzing the text to determine whether all or a portion of the text relates to one or more products or services, searching for advertisement data for the one or more products or services, and displaying the advertisement data resulting from the search at a location between the text input field and a keyboard of the mobile device.

In yet another aspect, the present disclosure features a system for providing situationally relevant data to a mobile device in response to an inline query. The system includes a mobile device having an input device; a directed message server; at least one content server; and at least one merchant device. The mobile device, the at least one content server, and the at least one merchant device are all in electrical communication with the directed message server.

BRIEF DESCRIPTION OF THE DRAWINGS

Various embodiment of this disclosure are described with reference to the accompanying drawings wherein:

FIG. 9 is a diagram showing an illustrative offer screen for inputting offer information, in accordance with embodiments of this disclosure.

DETAILED DESCRIPTION

Figure 1:
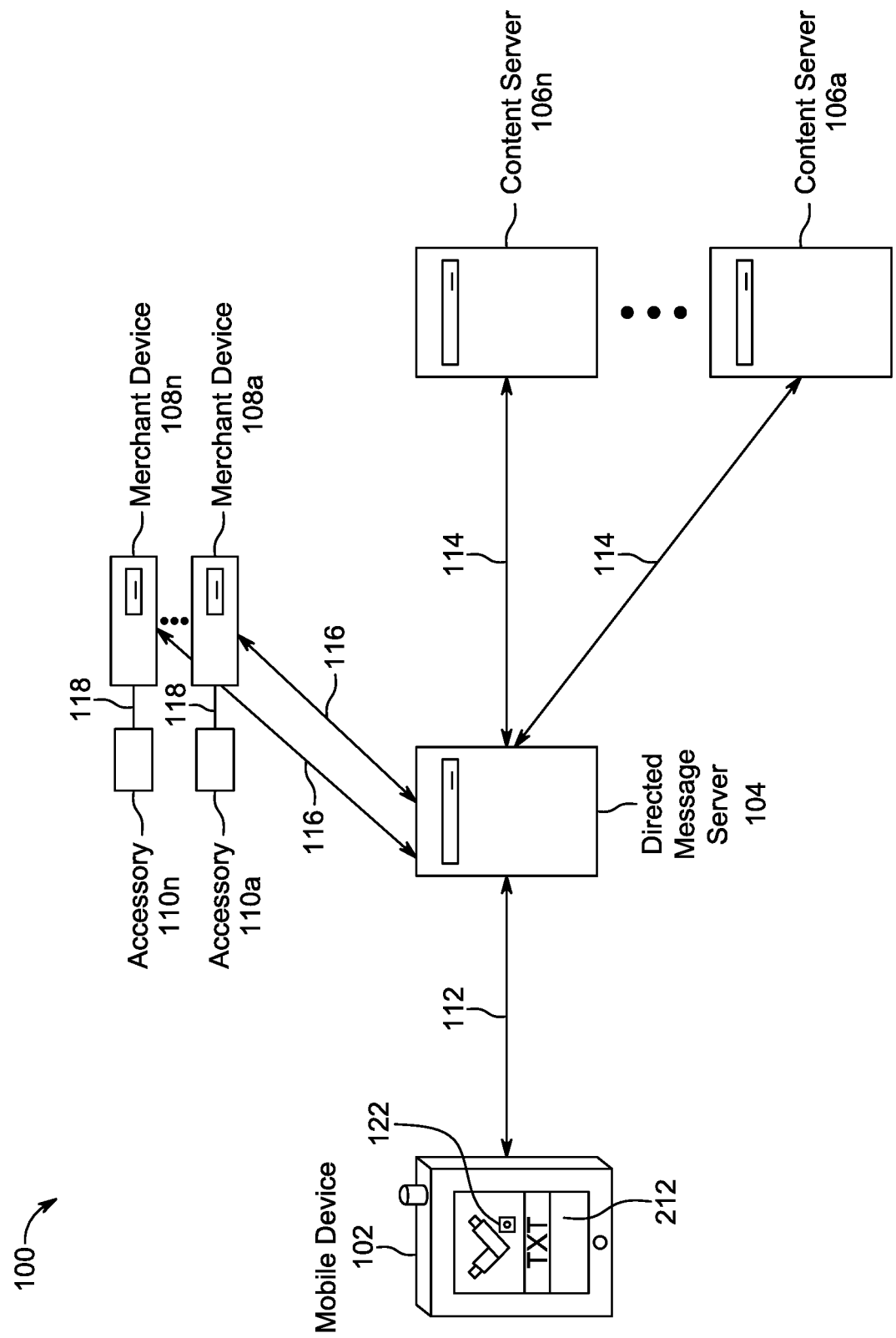
FIG. 1 is a schematic diagram of a situationally relevant data transmission system, in accordance with embodiments of this disclosure.

This disclosure is directed to systems and methods for analyzing information input by individuals engaging with mobile devices. Information input by an individual which is analyzed may include, without limitation, text obtained by mobile devices during messaging, searching, and the like. In one aspect, information input by an individual to a mobile device is received and analyzed by a computing device to determine whether situationally relevant information, e.g., situationally relevant content elements or offers in an ad campaign, is retrievable for display on the mobile device. Once the available situationally relevant information is identified, the information is transmitted to the mobile device for display thereon.

For example, as a user enters text in the input field of a communications application running on a mobile device, the systems and methods of this disclosure analyze the text input by the user and pushes information that is related or relevant to all or a portion of the text. The user will likely consider that information valuable because it relates to the text. For example, a user may be engaged in a text conversation with the user's spouse and type a phrase including the words "Home Depot" (e.g., "I'm going to drop by Home Depot to pick up more nails. Do you need anything?"). The systems and methods of this disclosure would then provide timely information including the Home Depot nearest the user's location, available discounts, and discounts provided by a competing retailer. In this manner, aspects of this disclosure provide users with timely, value-driven, and/or location-specific advertisements or promotions.

Provided below is a brief illustrative example of aspects of this disclosure. In aspects, a system for providing situationally relevant information includes a mobile device, a directed message server, at least one content server, and at least one merchant device. As defined herein, the directed message server is any suitable computing device which controls and selectively transmits data such as, without limitation, content data, advertisement data, and the like. It should also be noted that the directed message server and the at least one content server may be combined into a single computing device (e.g., the data stored therein and functionality provided by are performed on shared resources). For purposes of clarity, the discussion provided hereinbelow will refer to both the directed message server and the one or more content servers as independent computing devices. The directed message server is in either wired or wireless electrical communication with the above-enumerated devices. When connected, the directed message server is configured to receive and/or transmit data such as, without limitation, text and image data. Upon receipt of the text and/or image data, the directed message server determines whether the received data will be transmitted either to the mobile device to be displayed or to the content server to solicit content therefrom.

The mobile device is configured to execute one or more programs which receive and analyze input entered into the mobile device and, based on the input, display situationally relevant data on the display. The situationally relevant data may subsequently be transmitted or input into one or more accessories of the merchant device. Transmission of the situationally relevant data to the merchant device may subsequently be transmitted to the directed message server so as to verify the authenticity of the situationally relevant data.

Once the directed message server receives situationally relevant data from the merchant device, the directed message server may analyze the situationally relevant data. Based on the analysis of the situationally relevant data, the directed message server may transmit a signal to the merchant device to approve or disapprove a transaction. For example, the mobile device may have illustrated thereon identifying information such as, without limitation, a quick response (QR) code, barcode, and the like. As the identifying information is displayed, the merchant device may scan or otherwise receive input of the identifying information via the accessory (e.g., a scanner or keyboard). Additionally or alternatively, the mobile device may transmit one or more signals, e.g., a near-field communication (NFC) signal, to be input to the merchant device via a signal receiver or sensor.

In response to receiving input, the merchant server may transmit the received situationally relevant data to the directed merchant server for verification. Verification may include verifying the authenticity of the situationally appropriate data, that a timestamp associated therewith has expired, that the situationally appropriate data corresponds to the current transaction being processed by the merchant device, etc. The directed message server may subsequently transmit a signal to the merchant device indicating that the transaction is approved or disapproved. If approved, the merchant device may record the transaction in a database and/or transmit the record of the transaction for review by a third-party controlled device.

Referring now to FIG. 1, a schematic diagram of a situationally relevant data transmission system, in accordance with certain embodiments of this disclosure, is illustrated and designated generally 100. The system 100 includes a mobile device 102, a directed message server 104, one or more content servers 106a-106n, and one or more merchant devices 108a-108n. The one or more merchant devices 108a-108n may be further associated with corresponding accessories 110a-110n. The directed message server 104 is in either wired or wireless electrical communication with the mobile device 102, one or more content servers 106a-106n, and one or more merchant devices 108a-108n.

Communication links 112, 114, 116 are configured to establish electrical communication between the components illustrated in the system 100 of FIG. 1. Specifically, communication link 112 is configured to transmit signals between the mobile device 102 and the directed message server 104; communication links 114 are configured to transmit signals between the directed message server 104 and any one of the content servers 106a-106n; and communication links 116 are configured to transmit signals between the directed message server 104 and any one of the merchant devices 108a-108n. For example, communication link 112 may transmit data thereacross associated with text or images received or displayed by the mobile device 102; communication link 114 may transmit data thereacross associated with one or more search queries generated by the directed message server 104; and communication links 116 may transmit data thereacross to verify and/or record information associated with a particular transaction.

The mobile device 102 includes a display 212 (see FIG. 2) of any suitable display form such as, without limitation, a touch-capacitive display, liquid crystal display (LCD), light emitting diode display (LED), and the like. The display 212 may have one or more regions 122 configured to project images therefrom, including a keyboard region, a suggestion region, and a media region. The one or more regions 122 may overlap, or occupy distinct areas along the display 212.

The mobile device 102 may further have an optical sensor (not shown) such as a camera and/or an audio sensor (not shown) disposed thereon. The optical sensor may receive and transmit images for analysis by either the mobile device 102 or the directed message server 104. Similarly, the audio sensor may receive voice input, environmental input, and the like, which is transmitted and analyzed in a manner similar data associated with images received by the optical sensor. For purposes of clarity, data received by either the display 120, the optical sensor, the audio sensor, and other such suitable sensors will be referred to herein as input data. The directed message server 104, content servers 106a-106, and merchant devices 108a-108n may include, in addition to the components discussed in connection with computing device 200 which is discussed below, connections configured to receive additional communication links (not shown) for facilitating electrical communication between the directed message server 104, content servers 106a-106n, and merchant devices 108a-108n, as well as devices not shown in FIG. 1.

Figure 2:
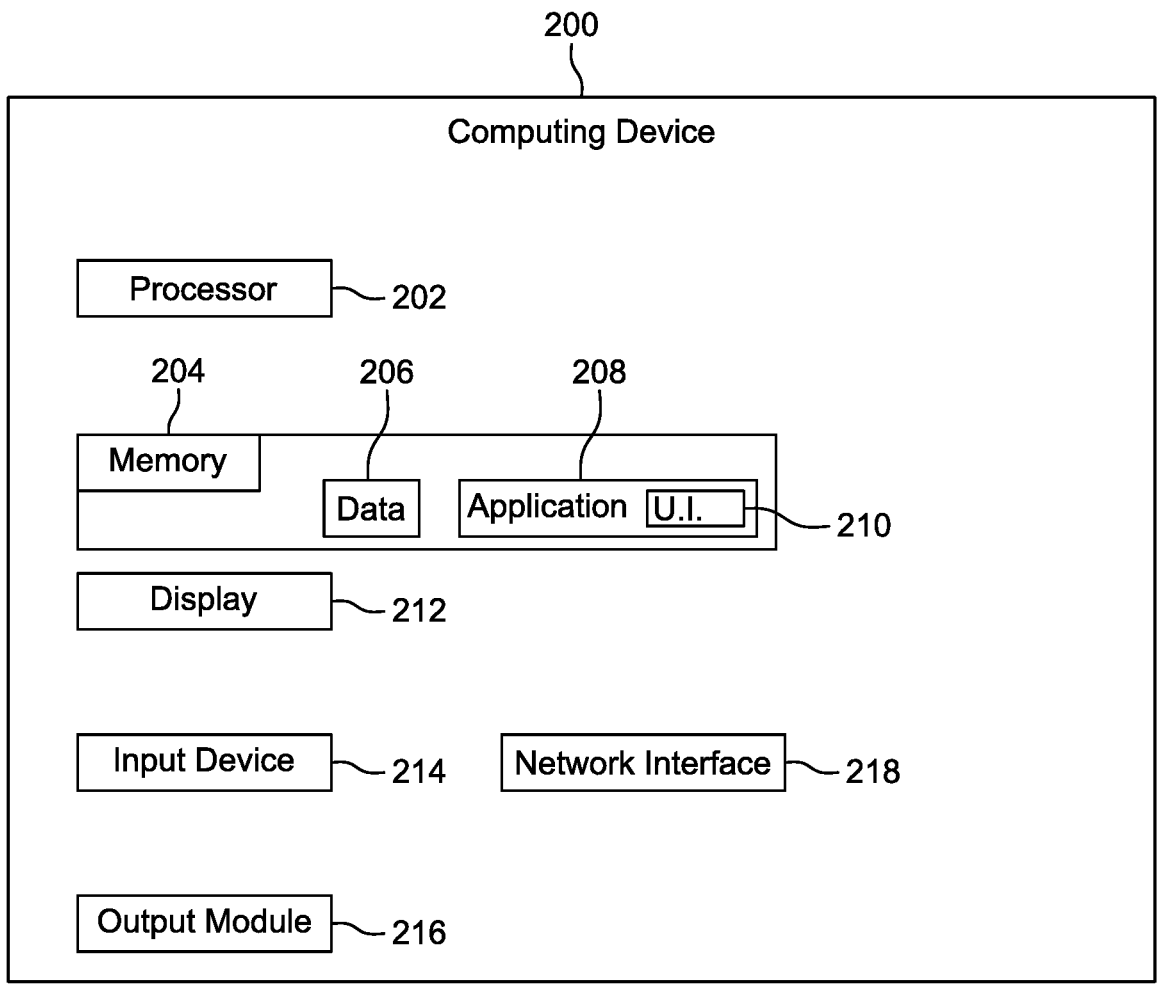
FIG. 2 is a schematic block diagram of an illustrative embodiment of a computing device that may be employed in various embodiments of this system, for instance, as part of the system or components of FIG. 1.
Figure 3:
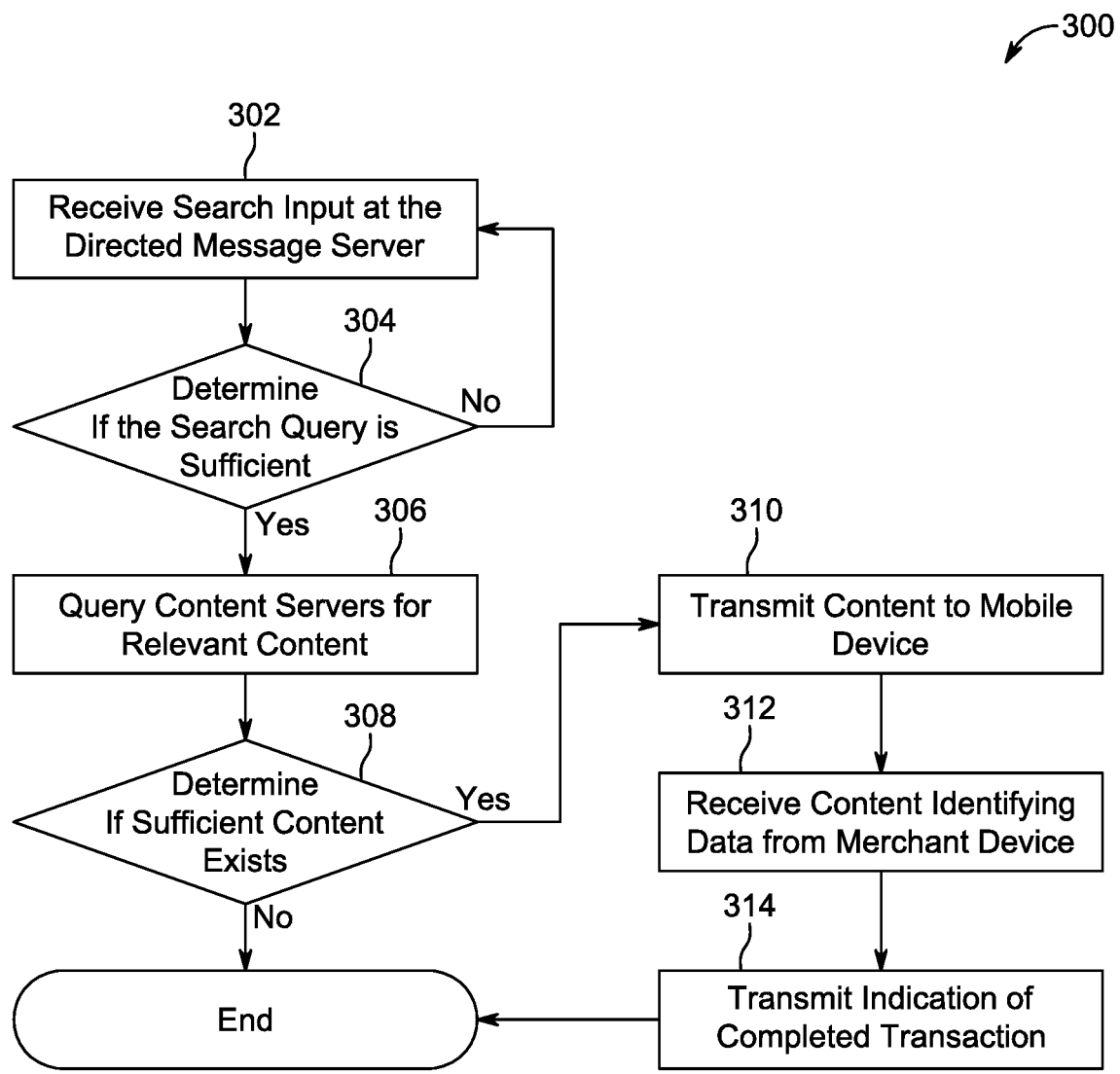
FIG. 3 is a flowchart showing an illustrative method for transmitting situationally relevant data, in accordance with embodiments of this disclosure.

Referring now to FIG. 2, illustrated is a schematic block diagram of a computing device 200 that may be employed according to various embodiments of this disclosure. Though not explicitly shown in corresponding figures of this application, the computing device 200, or one or more components thereof, may represent one or more components (e.g., the mobile device 102, the directed message server 104, one or more of the content servers 106a-106n, one or more of the merchant devices 108a-108n, one or more of the corresponding accessories 110a-110n in electrical communication with the one or more merchant devices, and the like) of system 100. The computing device 200 may include one or more memories 204, processors 202, display devices or displays 212, network interfaces 218, input devices 214, and/or output modules 216, or any desired subset of components thereof.

The memory 204 includes non-transitory computer-readable storage media for storing data and/or software which include instructions that may be executed by the one or more processors 202 and which, when executed, control operation of the computing device 200, for example, according to one or more methods described herein. In embodiments, the memory 204 may include one or more solid-state storage devices such as flash memory chips. Additionally or alternatively, the memory 204 may include one or more mass storage devices connected to the processor 202 through a mass storage controller and a communications bus (not shown). Although the description of computer readable media described in this disclosure refers to a solid-state storage device, it will be appreciated by one of ordinary skill that computer-readable storage media may include any available media that can be accessed by the processor 202. More particularly, computer readable storage media may include non-transitory, volatile, non-volatile, removable, non-removable media, and the like, implemented in any method or technology for storage of information such as computer readable instructions, data structures, program modules, or other suitable data access and management systems. Examples of computer-readable storage media include RAM, ROM, EPROM, EEPROM, flash memory, or other known solid state memory technology, CD-ROM, DVD, Blu-Ray or other such optical storage, magnetic cassettes, magnetic tape, magnetic desk storage or other magnetic storage devices, or any other medium which may be used to store information and which can be accessed by computing device 200.

In embodiments, the memory 204 stores data 206 and/or one or more applications 208. Such applications 208 may include instructions which are executed on the one or more processors 202 of the computing device 200. In aspects, the application 208 may include instructions which cause a user interface component 210 to control the display device 212 such that a user interface 210 is displayed (e.g., a graphical user interface (GUI) (see FIGS. 4A-4C)). The network interface 218, in certain embodiments, is configured to couple the computing device 200 and/or individual components thereof to a network, such as a wired network, a wireless network, a local area network (LAN), a wide area network (WAN), a wireless mobile network, a Bluetooth® network, the Internet, and the like. The input device 214 may be any device of which a user may engage with to enter input. For example, the input device 214 may include any combination of a mouse, a keyboard, a touch-capacitive display, a voice interface, and/or the like. The output module 216 may, in embodiments, include any connectivity port or bus, such as, for example, a parallel port, a serial port, a universal serial bus (USB), or any other similar connectivity port known in the art.

Referring now to FIG. 4, illustrated is a flowchart depicting an illustrative method for transmitting situationally relevant data, in accordance with certain embodiments of this disclosure, the method designated generally process 300. As described, the mobile device 102, the directed message server 104, one or more of the content servers 106a-106n, and one or more of the merchant devices 108a-108n, as well as corresponding accessories 110a-110n may include various components of computing device 200, described above. The processes described in this application, including process 300, may be performed and/or executed on one or more of the components described in computing device 200. Further, one of ordinary skill will recognize that the processes described may be performed as single or unitary processes or, in the alternative, may be performed by performing a set of sub-processes. While the processes and sub-processes associated with process 300 are described in a particular order for purposes of clarity, it is contemplated that performance of particular processes may occur in differing order without departing from the scope or spirit of this disclosure. Further, specific examples of execution of any or all of the particular processes described below should not be seen as limiting, but merely as exemplary of embodiments consistent with this disclosure.

Process 300 starts at block 302, where a directed message server 104 receives a query from a mobile device 102. More specifically, as an individual provides input which is recorded by the mobile device 102 as input data 206, the mobile device 102 may either push the input data 206 to the directed message server 104 or wait until a predetermined amount of input data 206 is received by the mobile device 102 (block 302), and subsequently transmit or push the input data 206 to the directed message server 104. The input data 206 may include, without limitation, text input data received by the mobile device 102 associated with a text field of the mobile device 102, audio data received by the audio input device (not shown) of the mobile device 102, or image data captured by the image sensor (not shown) of the mobile device 102. In the case of text input, the mobile device may transmit the received input data 206. Each letter or symbol received as text input may be pushed individually, or in subsets, to the directed message server 104 for analysis.

At block 304, as the input data 206 stored in the mobile device 102 is transmitted to the directed message server 104 (block 302), and the transmitted data 206 is analyzed by processes executed on the processor 202 of the directed message server 104 to determine whether a sufficient quantity of data 206 has been received by the directed message server 104 to generate a search query. For example, referring again to text inputs, the mobile device 102 may receive input via the input device 214 (see FIG. 2) such as, without limitation, multiple text characters. The text characters may be measured to determine whether a predetermined amount of characters have been received by the directed message server 104, whether a predetermined amount of searchable terms have been identified in the input, etc. If the search query is not determined to be sufficient to generate a search query, process 300 returns to block 302 to receive additional input. Alternatively, if it is determined that sufficient input has been received to form a search query, process 300 continues to block 306.

At block 306, once the directed message server 104 determines that sufficient input has been receive, the search query is generated by the directed message server 104. To generate the search query, the directed message server 104 parses the input, removing, correcting, and/or repairing all or a portion of the identified searchable terms contained within the input. For example, the directed message server 104 may identify spelling errors, duplicative terms, tertiary terms (e.g., conjunctions such as "and," "or," and the like) and other such terms which may render the query inefficient or ineffective. Once the search query is generated, which may include generic or specific terms (e.g., "sport utility vehicle," "Disney world," or "dinner,"), the search query is transmitted to the one or more content servers 106a-106n to be matched with content stored as data 206 in the memory 204 of each respective content server 106a-106n.

In some embodiments, there may be one or more "triggers" that start a search on the client side. The triggers may include punctuation (e.g., a period, a question mark, or comma), or when a word count threshold is exceeded (e.g., the word count is five or more words). On the server side, the input text is parsed and a query is constructed. The query may include words representing brand names, time-of-day-based targeting, region of world, geo location, frequency of word counts, and proximity of words within the input text. A profiling dimension may be added to the query to match similar input texts that have historically delivered the most popular offerings, which may be measured, for example, by the frequency of an end user's interaction with presented offerings.

At block 306, the search query is transmitted to the one or more content servers 106a-106n. Upon receiving the search query, the respective content servers 106a-106n determine whether any situationally relevant data 206 is stored in the memory 204 of the one or more content servers 106a-106n (see FIGS. 4B and 4C). At block 308, if situationally relevant data is determined to exist in the memory 204 of the one or more content servers 106a-106n, the situationally appropriate data 206 is transmitted from the one or more content servers 106a-106n to the directed message server 104. Alternatively, if no situationally relevant data is determined to exist in the one or more content servers 106a-106n, process 300 terminates.

At block 310, the directed message server 104 processes the situationally relevant data 206 received from the one or more content servers 106a-106n and, once processing is complete, transmit the processed data 206 to the mobile device 102. Processing performed by the directed message server 104 may include deleting duplicates received from the one or more content servers 106a-106n, for example, where the same data 206 is received by a first content server 106a and a second content search server 106b. In addition to deleting duplicates the directed message server 104 may prioritize and/or truncate the results received from the one or more content servers 106a-106n.

For example, the directed message server may order the results based on predetermined criteria or rules stored in the memory 204 of the directed message server 104. The directed message server may include a scoring or relevance engine, which examines the semantics and syntax of an input string using dimensional data and/or contextual search mechanisms to determine context and find a suitable offer or ad to be displayed in the keyboard extension application.

The dimensional data may include at least one of location, demographics, communications history analysis, or common word pairings. The contextual search mechanisms may determine context by analyzing the relationship between two words in an input string. For example, a contextual search mechanism may look at the proximity of two words in an input string and place more relevance on adjacent words than on two words separated by one or more other words.

For example, in the case of merchant advertising, the results listed may be ordered according to the purchase or bids for priority over other situationally relevant data proffered by merchants competing for advertisement space. Additionally or alternatively, the resulting situationally relevant content may be displayed according to their determined relevance. For example, again with respect to merchant advertising, when a search query is submitted with two words or terms (e.g., "Honda Accord") and two different situationally relevant data elements are retrieved from the one or more content servers 106a-106n (e.g., data associated with the queries "Honda Sedans" and "Honda Accord Sedans"), the first listed situationally relevant content element may be the element including the most corresponding sub-terms (in the current example, "Honda Accord Sedans" would be listed first).

Notably, when more than one set of rules are used to order the received situationally relevant content elements, the rules may be ordered according to predetermined criteria as well. For example, a rule hierarchy may be established whereby a first rule type (e.g., payment or bidding) takes priority over a second rule type (e.g., the determined relevance of the search query to the situationally relevant content elements. Once the processed situationally relevant content elements are ordered according to the one or more predetermined rules, the situationally relevant content elements are transmitted to the mobile device 102. The directed message server 104 may, in addition to transmitting the situationally relevant content elements, record such transmission in a query log stored in the memory 204 of the directed message server 104 for recall.

In embodiments, the mobile device 102 (FIG. 1) may transmit the received situationally relevant content to one or more computing devices (e.g., mobile device 102, communication devices such as laptop computers, desktop computers, other personal computing devices, and the like). For example, when the individual receives content they may, if desired, forward the content to a second individual. As a result, content forwarded to the second individual may be processed in a similar manner as it is with respect to the individual, thereby enabling them to take advantage of the content (e.g., redeem a coupon code, review information about an establishment such as operating hours, and the like).

At block 312, the directed message server 104 receives one or more identifying elements from one or more merchant devices 108a-108n corresponding to a specific situationally relevant content element that was transmitted to the mobile device at block 310. The particular situationally relevant content element transmitted to the mobile device 102 at block 310 may include the one or more identifying elements such as, without limitation, a serial number, a unique keyword or phrase, a barcode, and the like. When a particular merchant device 108a-108n is used to facilitate a transaction (e.g., without limitation, the purchase of a good or service, verification of the location of a mobile device 102 at a particular location, verification of the presence of the mobile device 102 during a particular transaction, or the like), the corresponding merchant device 108a-108n may receive input from the mobile device 102 indicative of the identifying elements associated the situationally relevant content element. For example, when a barcode is stored in the situationally relevant content data, the barcode may be displayed on the display 212 of the mobile device 102. The accessory 110a-110n of the corresponding merchant device 108a-108n may scan the barcode and, in response to scanning the barcode, transmit the barcode to the directed message server 104.

At block 314, once received by the directed message server 104, the identifying elements may be matched with a particular query stored in the query log. The directed message server 104 may, upon matching the identifying elements to the particularly query in the query log, transmit a signal to the particular merchant device 108a-108n to notify the merchant device 108a-108n of the validity of the identifying elements. Such verification may be used to complete the transaction which the particular merchant device 108a-108n is facilitating.

Additionally or alternatively, at block 314 the directed message server 104 and/or the particular merchant device 108a-108n may transmit a signal to one or more computing devices (not shown) associated with an entity with which the situationally relevant content element originated from (e.g., without limitation, a merchant, an association, and the like). The computing device may subsequently register the transaction, and in response, execute one or more subsequent transactions. Subsequent transactions may include, without limitation, remitting payment, transmitting additional content elements to the mobile device 102, and the like.

The following examples are provided for purposes of illustrating execution of process 300 within the system 100 of FIG. 1. It is noted that such illustrative examples are not intended to be limiting. Rather, the below-provided examples are included for the purpose of illustrating certain features described hereinabove.

Figure 4A:
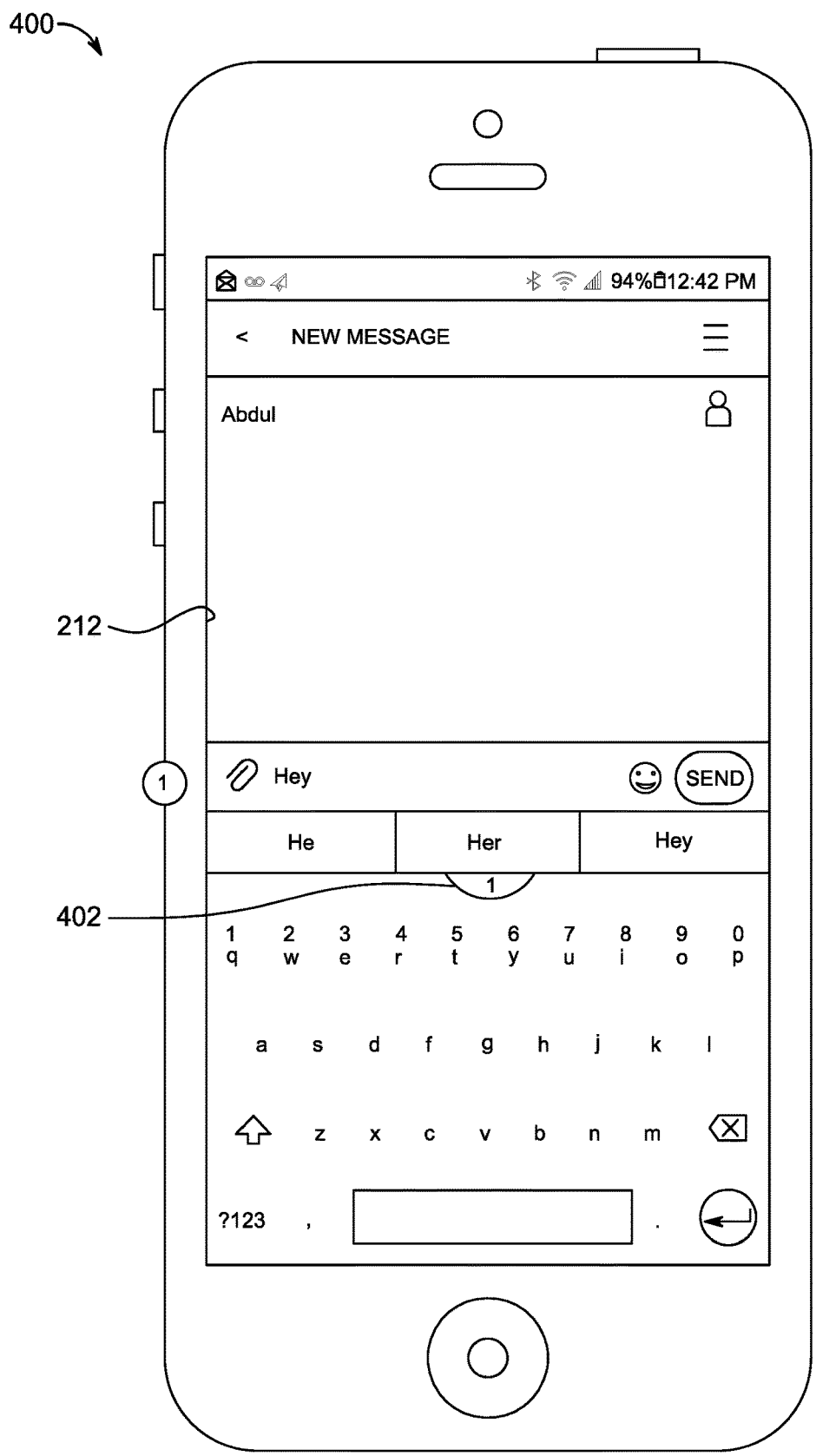
FIGS. 4A-4C are illustrations of a computing device displaying situationally relevant information in accordance with embodiments of this disclosure.
Figure 4B:
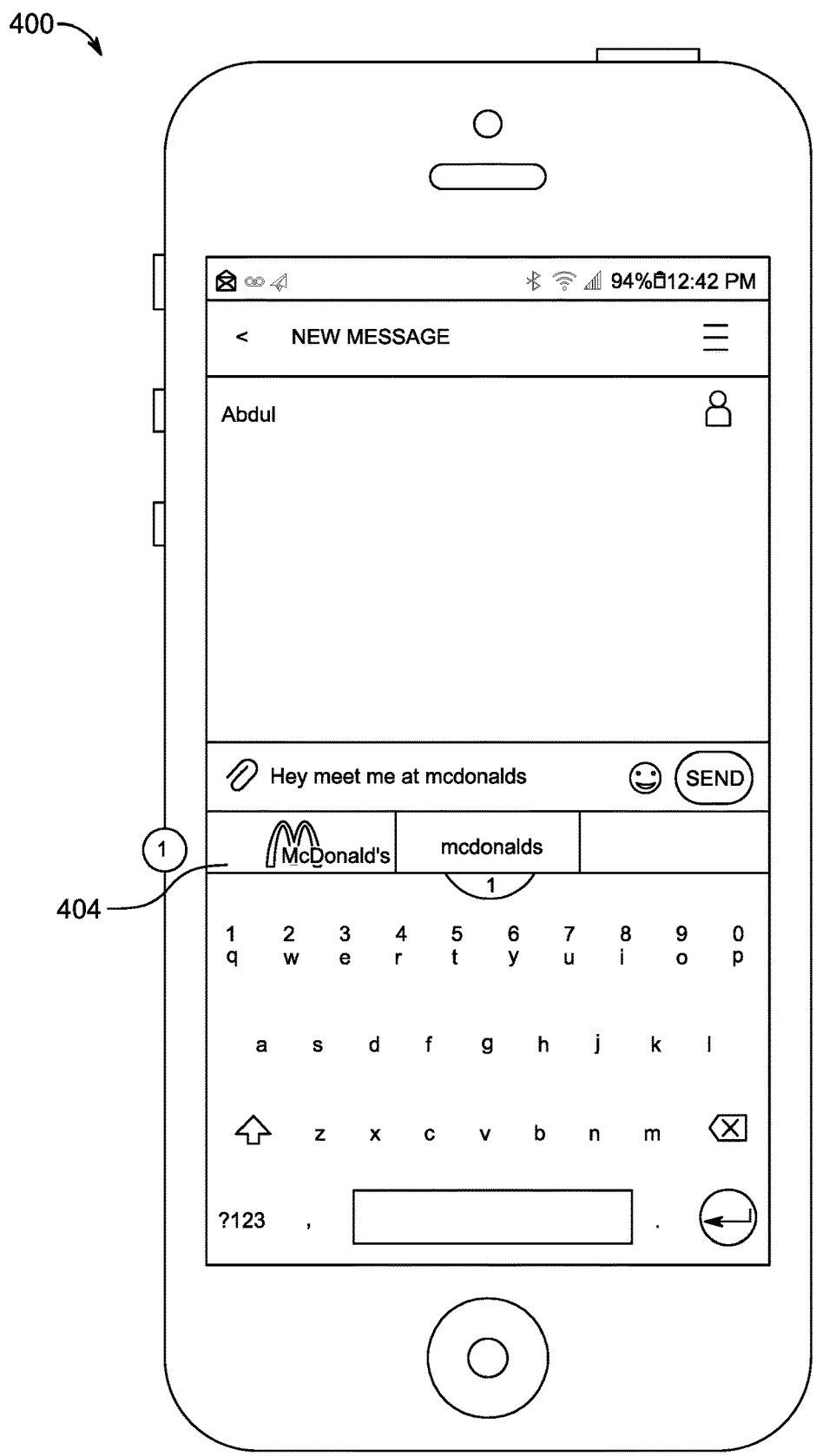
Figure 4C:
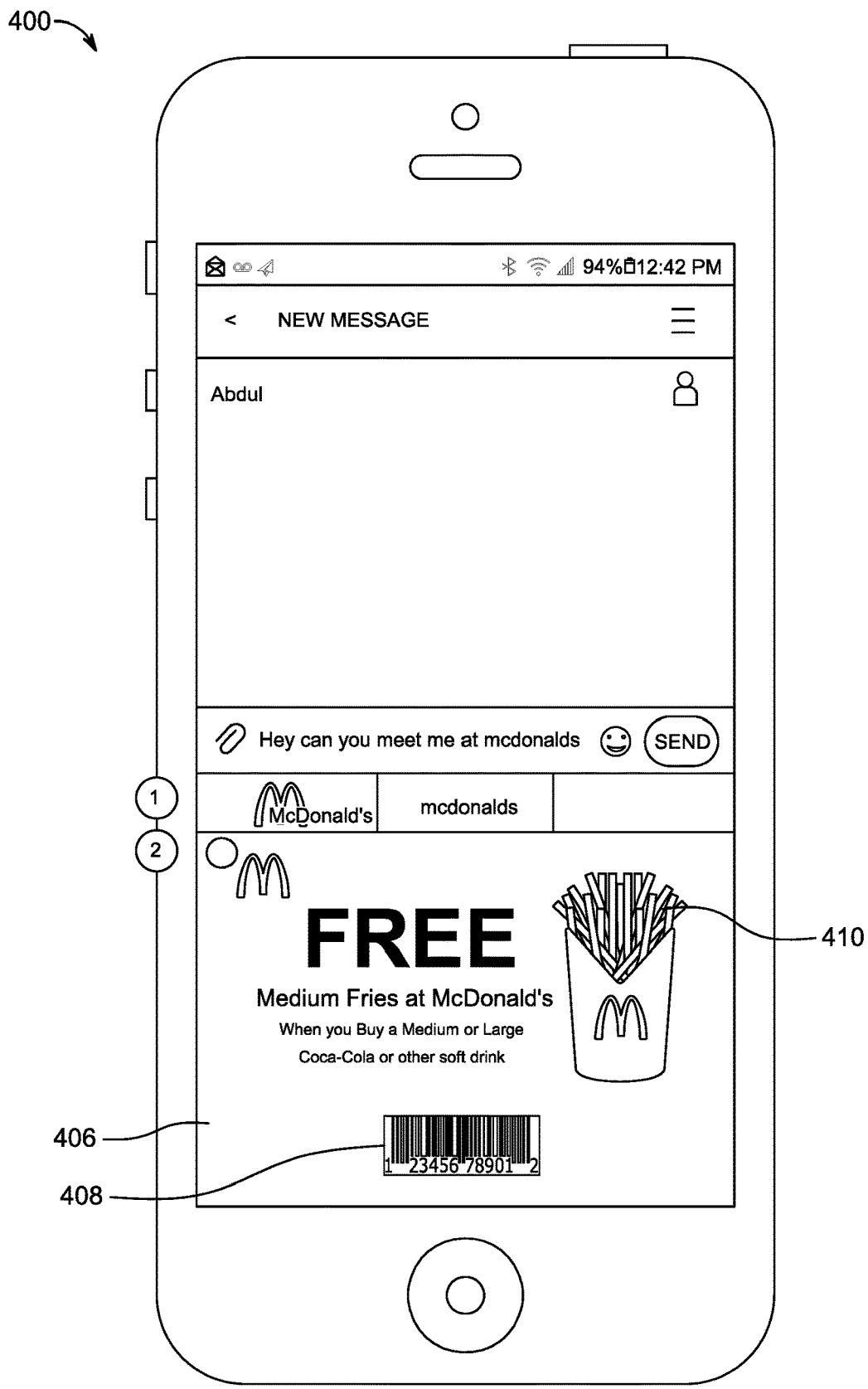

Referring to FIGS. 4A-4C, in general, instant messaging applications executed on mobile devices 102 (see FIG. 1) have a spatial configuration similar to the one illustrated in FIG. 4A. For example, the top portion of the display 212 of a mobile device 102 may define a space for displaying communications; the center portion may define an editing space for displaying information relevant to the current message being composed, including input text; and the bottom portion may define a keyboard space for displaying a keyboard therein. As a message is composed, the space for displaying recommended words and/or phrases (hereinafter "recommendation space") is illustrated within the upper portion of the keyboard space. The recommended words and/or phrases may be selected from an index of predetermined words or phrases based on text input received and illustrated in the center portion of the display. For example, when a mobile user types "Hey," (FIG. 4A) three recommended words, "He," "Her," and "key" are displayed in the top portion of the keyboard space. When the individual selects a recommended word from among the displayed recommended words, the current word being typed into the editing space is changed to the selected word or phrase.

In a case when an individual types a phrase which includes an identifiable term such as "mcdonalds," (see FIG. 1B), the individual may want to search for a McDonalds and, in particular, identify information about a menu, location, price, business hour information, etc. of McDonalds. Traditionally, the individual would be required to execute a second application on the mobile device 102, thereby causing the content displayed on the display 212 of the mobile device 102 to change. Upon execution of the second application, the term "mcdonalds" would again have to be input into the keyboard region of the mobile device 102 and a search result directly related to the term "mcdonalds" would have to be identified by the individual. Further, when the individual desires to forward the information identified to the messaging recipient would have to copy the information retrieved by the search, transition from the second application to the messaging application, paste the copied information from the search, and send the copied information to another individual operating a second mobile device (not shown).

In accordance with the above-described embodiments of this disclosure, a recommendation space is provided in the upper portion of the keyboard space to address such issues, though it should be noted that the recommendation space is not necessarily limited to any particular region of the display 212 of the mobile device 102. For example, as shown in FIG. 4B, when the individual inputs the text "mcdonalds," the characters are transmitted to the directed message server 104. Based on the received input, the directed message server 104 identifies the keyword "mcdonalds," and possibly the corresponding proper noun "McDonalds®". The directed message server 104 subsequently transmits the identified terms ("mcdonalds" and "McDonalds®") as a query to the one or more content servers 106a-106n (FIG. 1) to identify any available information (e.g., "McDonalds®" advertisements), or situationally relevant content elements, related to the query.

Once the directed message server 104 transmits the situationally relevant content elements to the mobile device 102, which is illustrated as a McDonalds® thumbnail 404, an advertisement 410, and a barcode 408 (FIGS. 4B and 4C), a notification bar 402 shows a notification. For example, as shown in FIGS. 4A and 4B, once input is recognized the notification bar 402 appears indicating that "1" instance of situationally relevant content elements is available for review. As shown in FIG. 4B, when a particular term, here "mcdonalds" is recognized, the McDonalds® thumbnail is displayed. The thumbnail 404 may be presented as text or as a graphic or image similar to the illustrated McDonalds® thumbnail, which includes the McDonalds® icon disposed thereon.

To transition from the display 212 illustrated in FIG. 4A or 4B to the display 212 illustrated in FIG. 4C, the display 212 receives input thereon to cause the notification bar 402 to shift downward. Such input may be in the form of a dragging gesture or tapping on the notification bar 402. In response to receiving the input to cause the notification bar 402 to shift downward, the keyboard displayed in the keyboard region 406 of the display is replaced with a content board. In this example, the content board may illustrate an advertisement for a free item as well as a barcode 408, which may be input to or scanned into a merchant device 108a-108n during a transaction. The keyboard and the content board may be displayed and controlled by a keyboard extension application running on a mobile device.

In the particular embodiment illustrated in FIGS. 4A-4C, when more than three situationally relevant content elements are transmitted to the mobile device 102, one or more rules are applied to determine which situationally relevant content elements will be displayed on the display 212. For example, since the amount of space provided in the recommendation space provides for only three sub-recommendation spaces (although it is contemplated that in other embodiments there may be any number of sub-recommendation spaces, e.g., two or five sub-recommendation spaces), the number of situationally relevant content elements is limited to such. In accordance with predefined rules, the three sub-recommendation spaces may be sold at a fixed rate, sold at auction to multiple entities (e.g., McDonalds®, Chipotle®, and the like), assigned to the three most-relevant situationally relevant content elements, and the like. These rules, though predetermined or predefined, may change over time to reflect changes such as, bidding by one entity to obtain advertising priority over the other.

Referring again to FIG. 4C, when input is received on the display 212 indicating selection of one of the sub-recommendation spaces, a coupon redeemable from McDonalds® may be displayed in the content board. When other sub-recommendation spaces are selected, the content board changes to illustrate the corresponding content board. In this embodiment, by continuously analyzing input associated with message information in real time, the systems and methods described can provide the appropriate situationally relevant content elements without the need to execute and interact with a second application. Further, by searching for the situationally relevant content as the text is input into the mobile device 102, the consumption of resources during operation necessary to run a second application, as well as gestures necessary to obtain the situationally relevant content elements, are reduced. Additionally, the area consumed to display the situationally appropriate content elements is reduced compared to traditional methods, since the content boards are displayed within the defined keyboard space via a keyboard extension application.

In embodiments, the systems and methods described above may be implemented as a plug-and-play mobile application (e.g., a keyboard application such as Swype®) or a modular mobile application package or plug-in which may be embedded into stand-alone mobile messaging applications and keyboard applications. In embodiments, analysis of communications may be reduced or suspended depending on whether the individual is inputting sensitive information (e.g., credit card information, passwords, etc.). The analysis of the communication may be deleted immediately or may be maintained in a historic query log, so as to assist in providing more appropriate situationally relevant content elements in subsequent queries.

The systems and methods of this disclosure solve many problems in the mobile advertisement technology space for end users, publishers, and advertisers. In embodiments, the system is a real-time conversational-based system for delivering value propositions to users of a keyboard in a mobile application. These offers are presented to the user of the keyboard via a suggestion bar. In embodiments, the client side of the system runs on iOS and Android smartphones, and the server side runs on a standard Linux platform.

Figure 5:
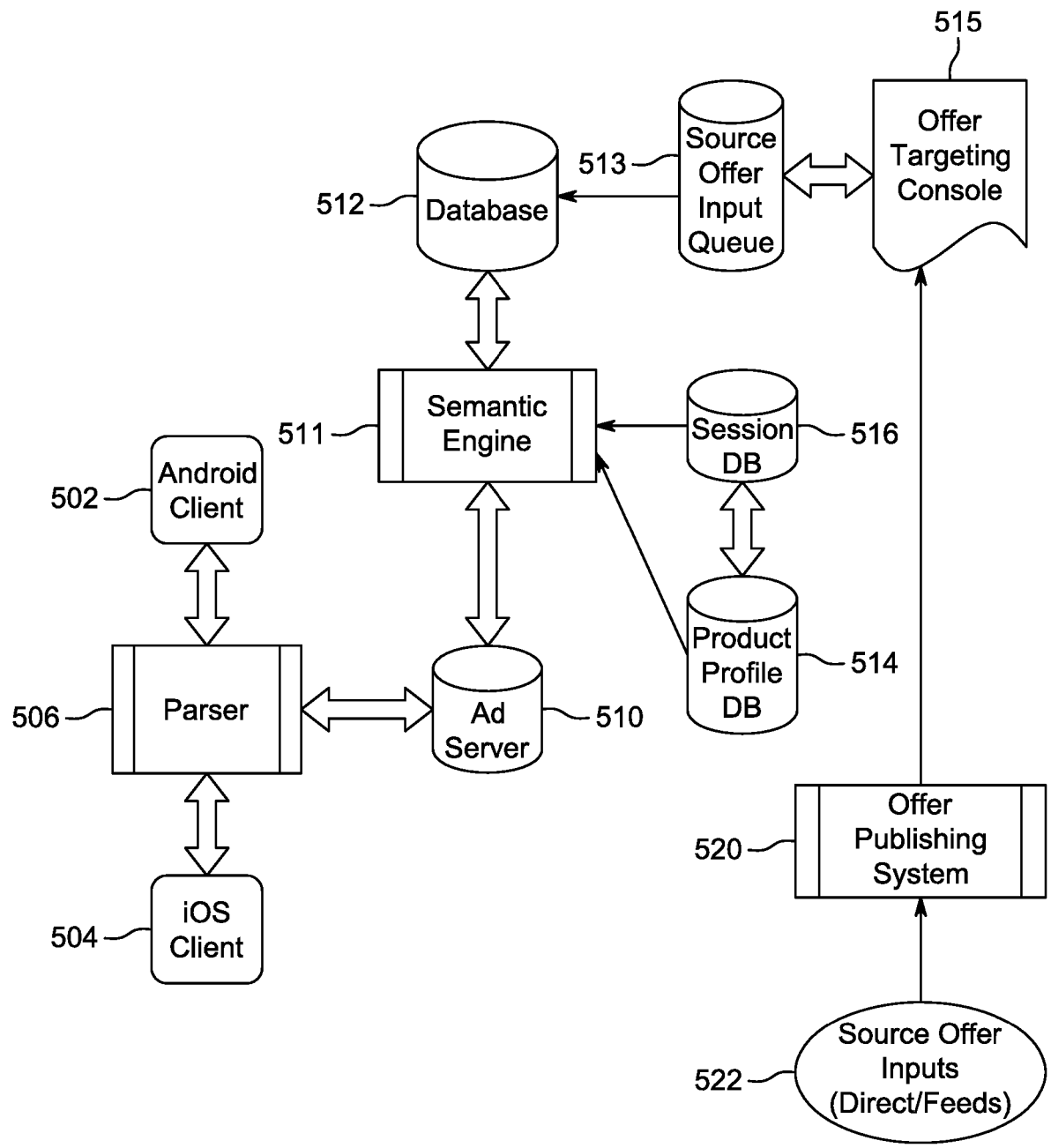
FIG. 5 is a schematic diagram of a system architecture for obtaining and providing situationally relevant data including offers, in accordance with embodiments of this disclosure.

FIG. 5 is a block diagram of a system architecture for obtaining and providing situationally relevant data including offers, according to an embodiment of this disclosure. The system architecture includes clients 502, 504, a parser 506, an ad server 510 in communication with the parser 506, a semantic engine 511 in communication with the ad server 510, a database 512, a product profile database 514, a session database 516, a source offer input queue 513, an offer targeting console 515, an offer publishing system 520, and source offer inputs 522. In embodiments, the client 502 or the client 504 and the parser 506 run on the mobile device 102 of FIG. 1. In some embodiments, the client 502 or the client 504 may include the parser 506.

The other components of the system architecture of FIG. 5 may be implemented by servers or other devices remote from the mobile device 102 of FIG. 1. For example, the directed message server 104 may be or may include the ad server 510. The directed message server 104 or the one or more content servers 106a-106n may include the semantic engine 511 and the databases in communication with the semantic engine 511, i.e., the database 512, the product profile database 514, and the session database 516. The one or more content servers 106a-106n and/or the one or more merchant devices 108a-108n may include at least one of the source offer input queue 513, the offer targeting console 515, the offer publishing system 520, or the source offer inputs 522. In one examplary embodiment, the merchant device 108a may be configured to present an offer targeting console 515 to the merchant so that the merchant can specify or modify the settings and/or parameters for an offer. The content server 106a may include the source offer input queue 513, which allows an administrator, which may be someone other than the merchant, to review and approve the offers in the source offer input queue 513. The approved offers may be stored in the ad server 510 so that the ad server 510 can deliver one or more offers selected by the semantic engine 511.

The client 502, 504 includes a keyboard extension application that provides a keyboard through which a user may interact with a mobile device, e.g., a smartphone. The client 502, 504 includes software, e.g., iOS or Android software, and other components that reside on a mobile device. The client 502, 504 may include a local, custom word dictionary, which is used for the autosuggest and autocorrect functions of the keyboard extension application.

The ad server 510 is coupled to the client 502, 504 via parser 506 and includes components and software modules for implementing the server side of the system. The ad server 510 may include at least one of a MySQL Database Server, an Apache Web Server, Revive/OpenX Ad Servers, Custom PHP code, or a Linux operating system. The parser 506, which may be a client module residing on the client 502 or 504, parses inputs to the keyboard extension application and makes an ad call to the semantic engine 511. The semantic engine 511 includes databases and applications that deliver a relevant offer to the keyboard extension application via the ad server 510 in an initiation process, which is described below.

In embodiments, the semantic engine 511 decides the one or more offers to present to the end user of the client 502 or 504 based on one or more keywords input to a messaging application via the keyboard extension application, and the ad server 510 delivers the offer to the client 502 or 504. The ad server 510 may also be used to perform tracking functions including, without limitation, tracking the number of impressions delivered by each campaign, tracking the number of clicks delivered by each campaign, and tracking post-click actions.

The database 512 stores the offers that have been assigned targeting parameters and dimensional metadata via the offer targeting console 515. The offers are published and made live as ad campaigns residing in the ad server 510. The database 512 is populated with offers from the offer publishing system 520.

The offer publishing system 520 may include or may interface with one or more databases and software modules (e.g., the offer targeting console 515), which assign targeting (e.g., keyword targeting in which keywords, including keywords used in conversational speech or in messaging applications, are assigned to an offer), styling, and dimensional metadata to the source offers 522 originating from merchants, affiliate feeds, or ad campaigns sold though ad agencies and third-party ad networks.

The systems and methods of this disclosure feature an initiation process, which includes displaying a product, brand, or merchant logo on the suggestion bar for presentation to the user of the keyboard extension application. The systems and methods of this disclosure further feature an activation process, which includes the user tapping the logo on the suggestion bar of the keyboard extension application to expand the logo to an actual offer overlaid on the keyboard extension application. The systems and methods of this disclosure may also include a wallet feature, which includes the process of the end user swiping right to save an offer to the client host application for later recall.

The keyboard extension application space includes a suggestion bar (e.g., the suggestion bar 610 of FIG. 6C), which displays a product, brand, or merchant logo in the initiation process. The offers may include published and trafficked offers which have been styled and targeted, and which meet the minimum requirement for a valid offer.

As described above, the systems of the present disclosure include a client, e.g., an Android client 502 or an iOS client 504, which runs on a mobile device, and an ad server 510. The client and ad server 510 may communicate using standard encrypted mobile communications protocols. Specifically, the system may utilize a Tera-WURFL (Wireless Universal Resource File) for proper device detection purposes. Within these protocols, the client 502, 504 and ad server 510 may perform a communications handshake, which may be customized, in a positive acknowledge or negative acknowledge (ack/nak) manner. As a user interacts with the keyboard extension application, which may run across one or more applications on the mobile device, a parser 506, which may be implemented in the client 502, 504, intelligently sifts through the words typed into the messaging window or field using the keyboard extension application, and checks the words against a local dictionary file to find suggested keywords. In other embodiments, the dictionary file may reside on the ad server 510 or another server. The dictionary may be updated in real time as new product offers, brand offers, or merchant offers are loaded and trafficked by the ad server 512. The parser 506 is configured so that major and minor brands are treated or considered as real words and may not be autocorrected to proper English terms as standard keyboard dictionaries may do. In other words, the dictionary may effectively be "Brand Aware".

In an initiation process, the parser 506 selects one or more words or terms from the text message input window or field (e.g., the text message input field 615 of FIG. 6C), wraps them in a system protocol wrapper, and invokes a system ad call to the ad server 510. The client 502, 504 then sets an event callback waiting for a response from the ad server 510. Within a short period (e.g., 200 milliseconds) the ad server 510 responds with an Ack/Nak response.

When an ad call is requested by the client 502, 504, the ad server 510 initiates the semantic engine 511. The semantic engine 511 strips and decodes the target keywords selected from the parser 506 and, in parallel, starts a series of queries, e.g., SQL queries, to determine the most relevant offer or offers from the database 512. The semantic engine 511 factors in dimensional data to determine the most relevant offer or offers. The dimensional data may include, without limitation, targeted keywords associated with an offer, time of day, geolocation filters, event-based metadata, and product profile data and end user session data stored in the product profile database 514 and the session database 516, respectively.

The product profile may include information regarding the relevant or ideal period, time of day, location or region, and/or manner in which an offer for a product should be presented to a user. For example, for products that are sold seasonally, e.g., a period before and including Valentine's Day, Halloween Day, or Saint Patrick's Day, the product profiles would indicate periods during which offers for those products would be relevant. The product profiles may also include information regarding keywords or phrases that are relevant to the product or keywords or phrases that are relevant to the product during a period of the year.

Using, for example, the natural language processing extensions of SQL, a query, which may be complex, is built and executed. The one or more returned offers are sorted by a SCORE qualifier, which ensures only those offers that meet a certain threshold (e.g., valid offers) are part of the result set and therefore are relevant to the end user's messaging conversation. The ad server 510 then formats the offers into a suitable format, e.g., the IAB standard expandable ad unit format, and returns the one or more offers to the client 502, 504.

Figure 6A:
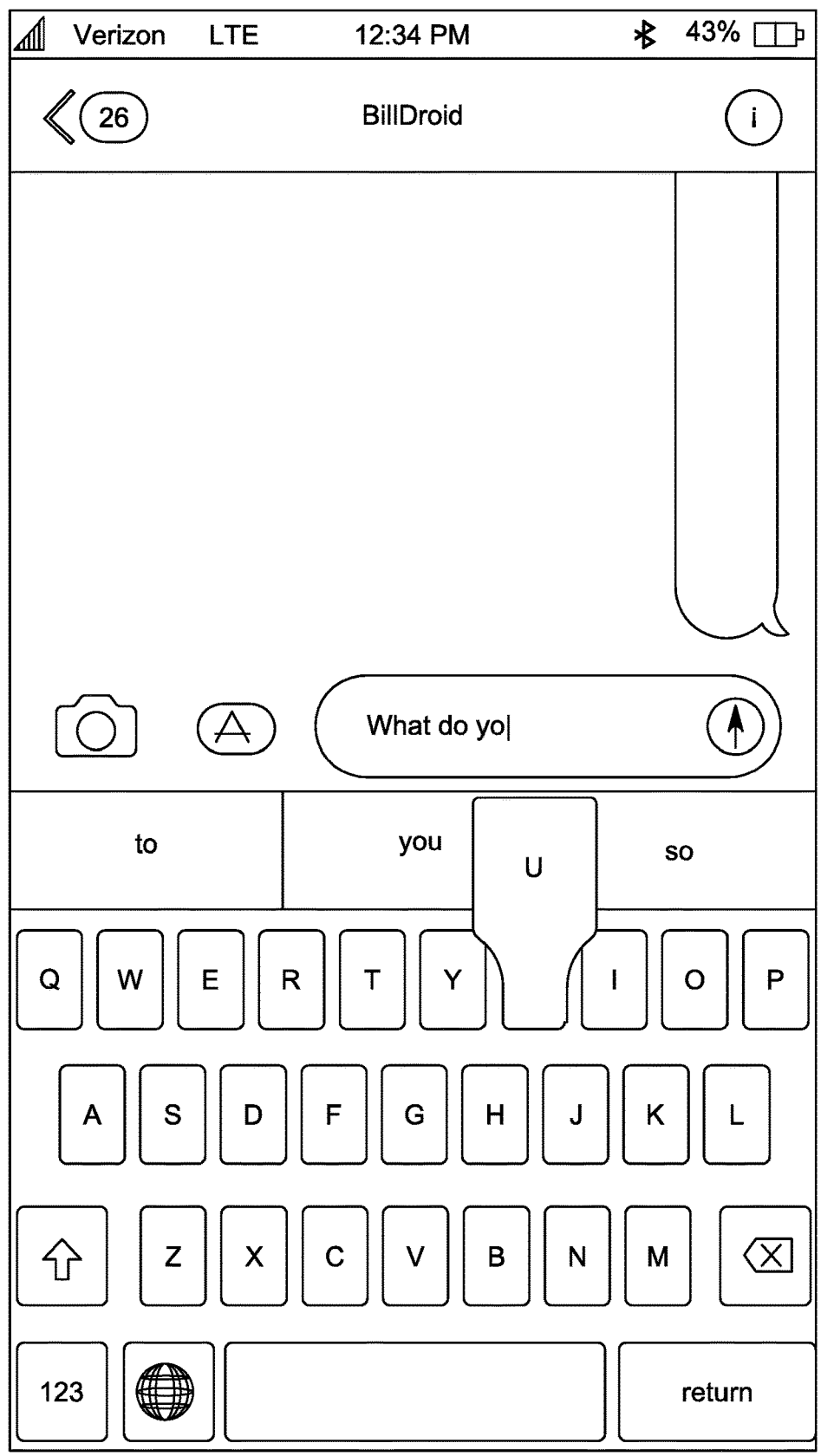
FIGS. 6A-6F are illustrations of a computing device displaying situationally relevant information, in accordance with other embodiments of this disclosure.
Figure 6B:
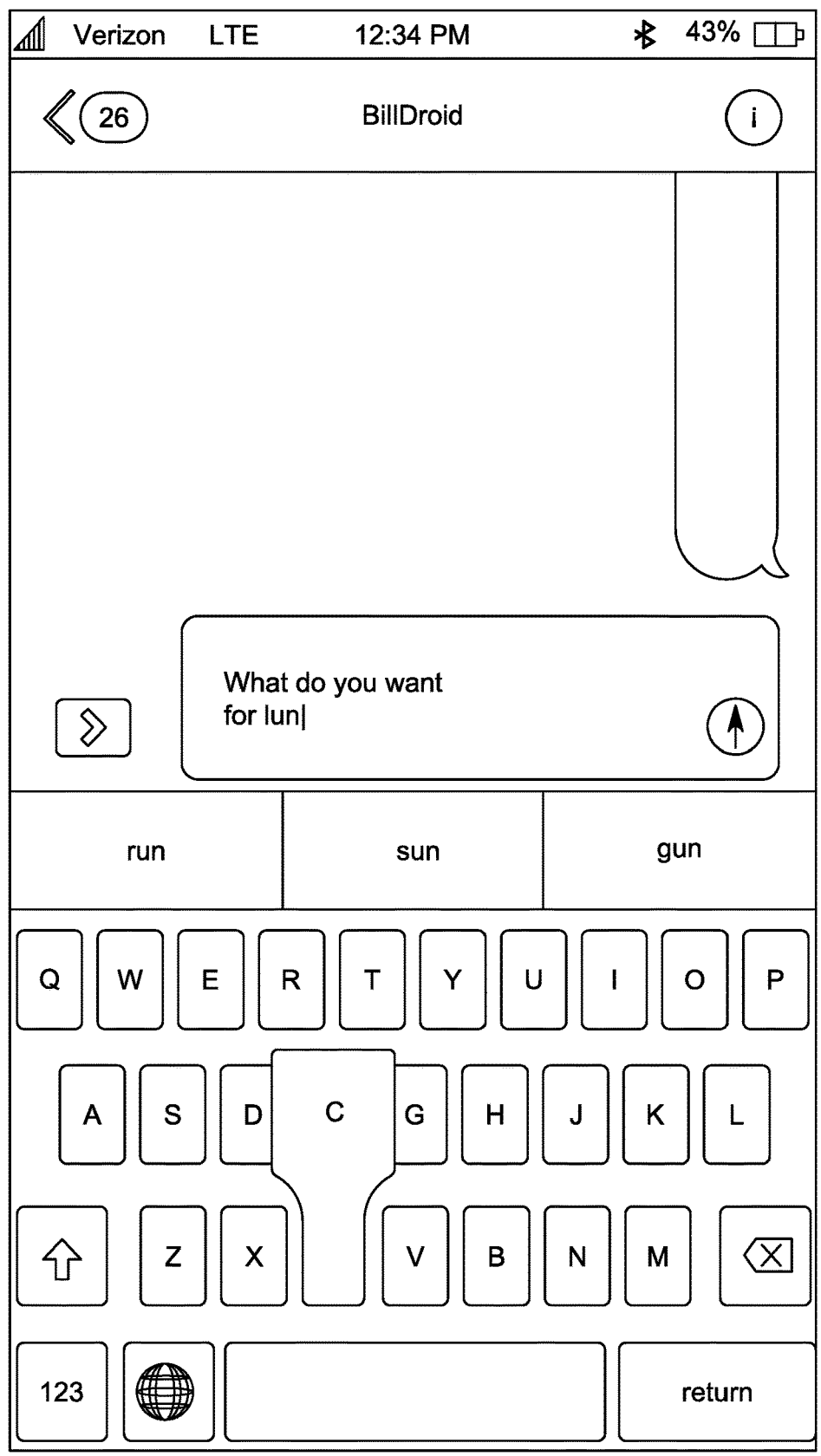
Figure 6C:
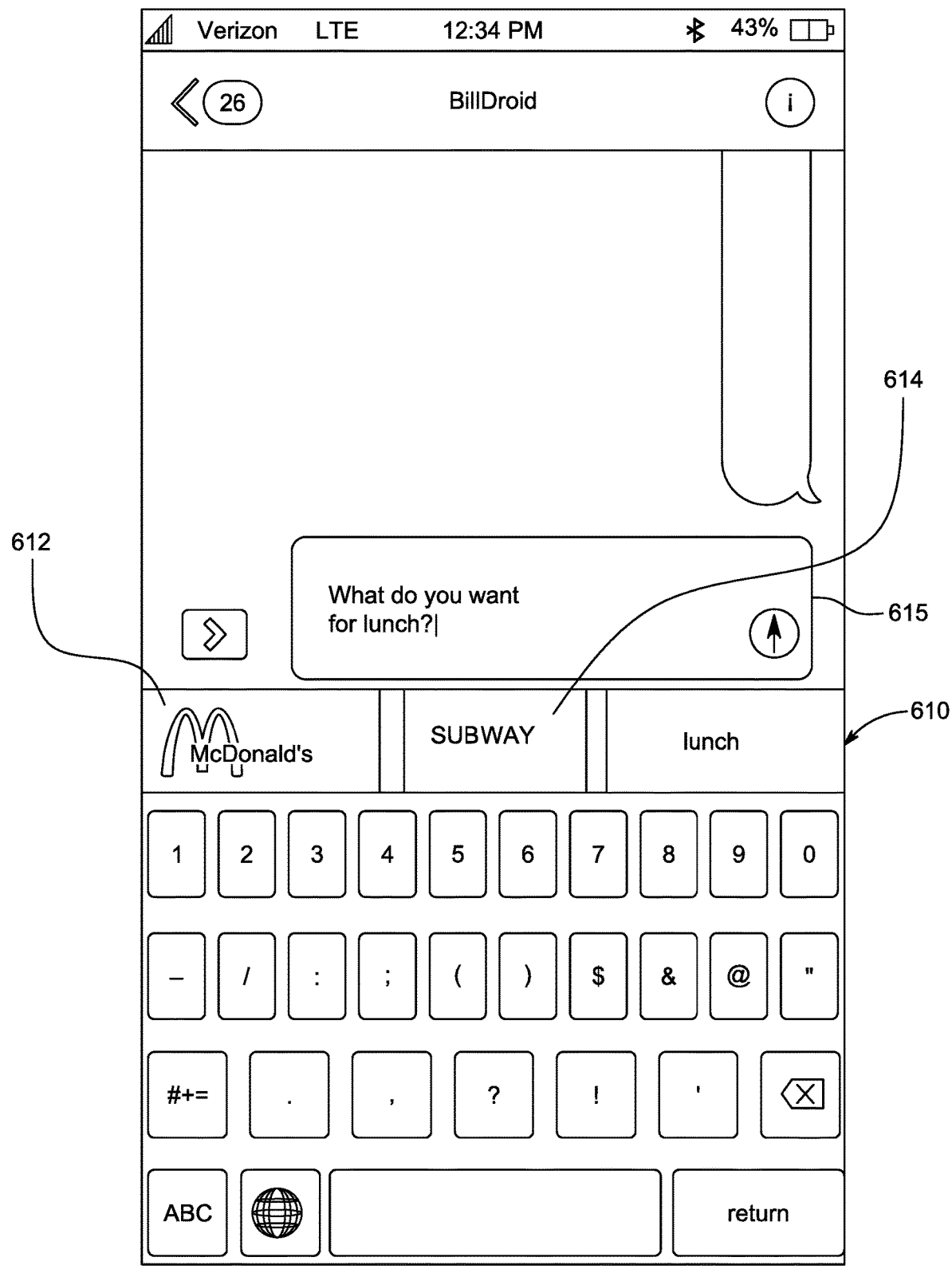
Figure 6D:
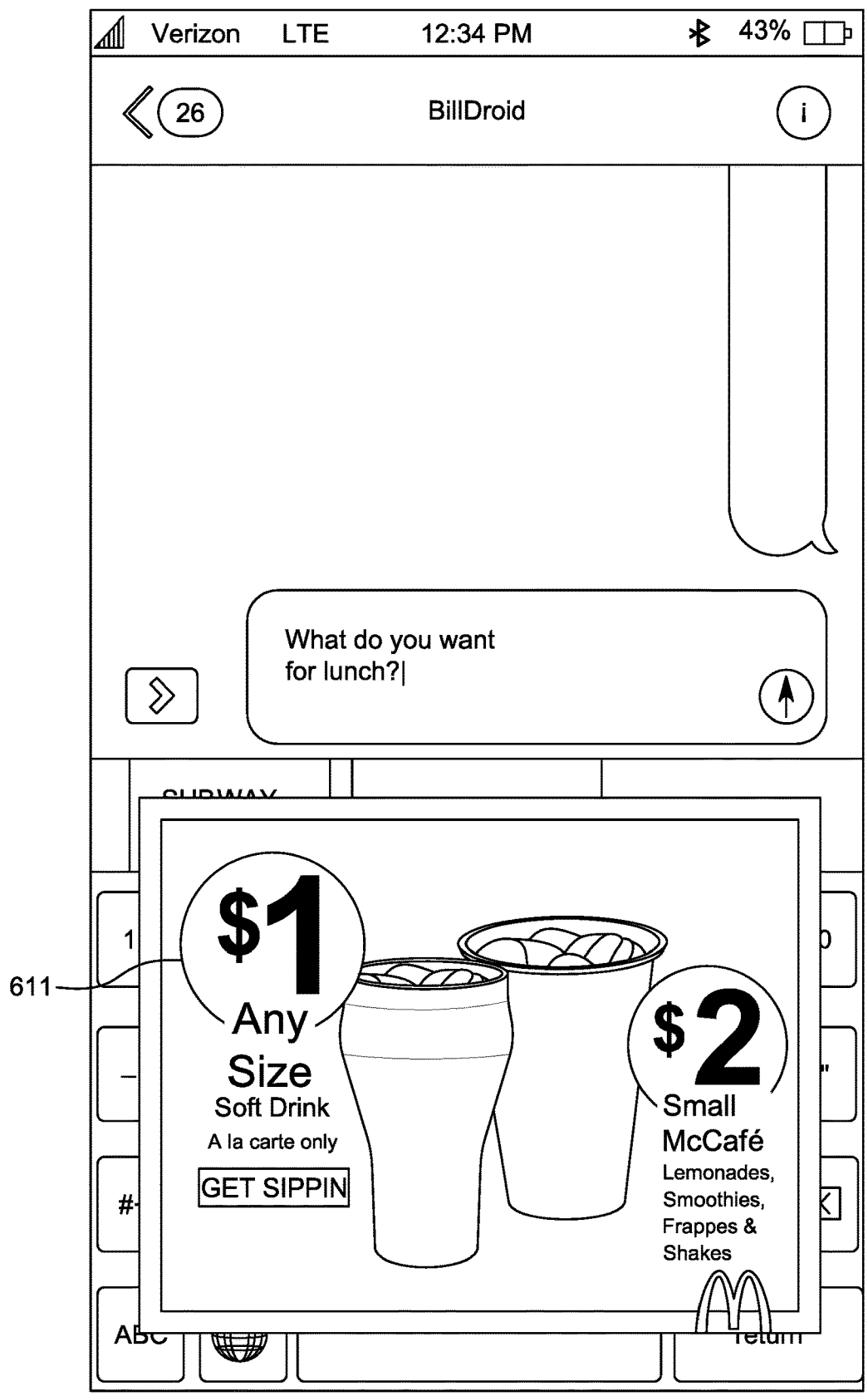
Figure 6E:
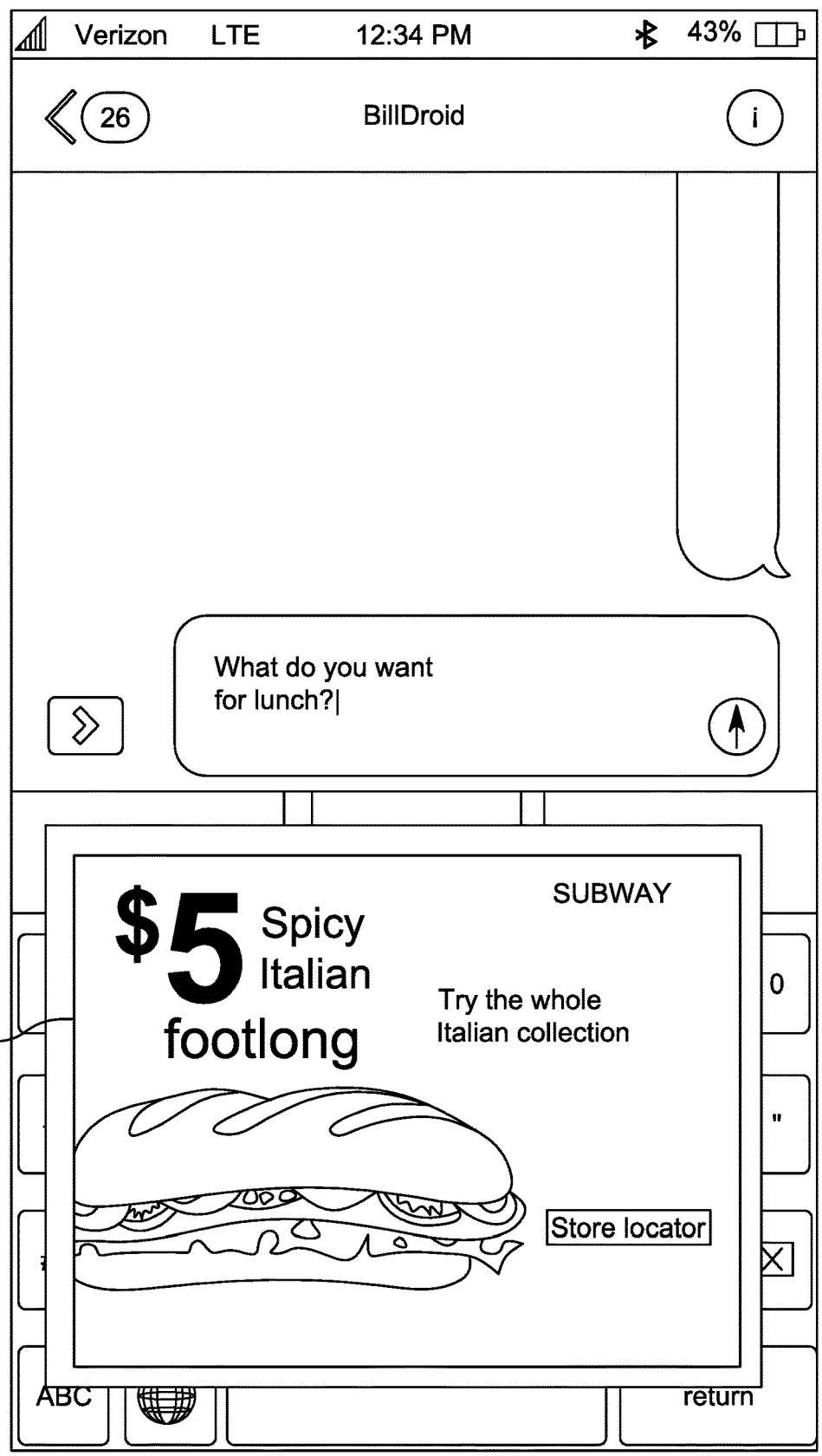
Figure 6F:
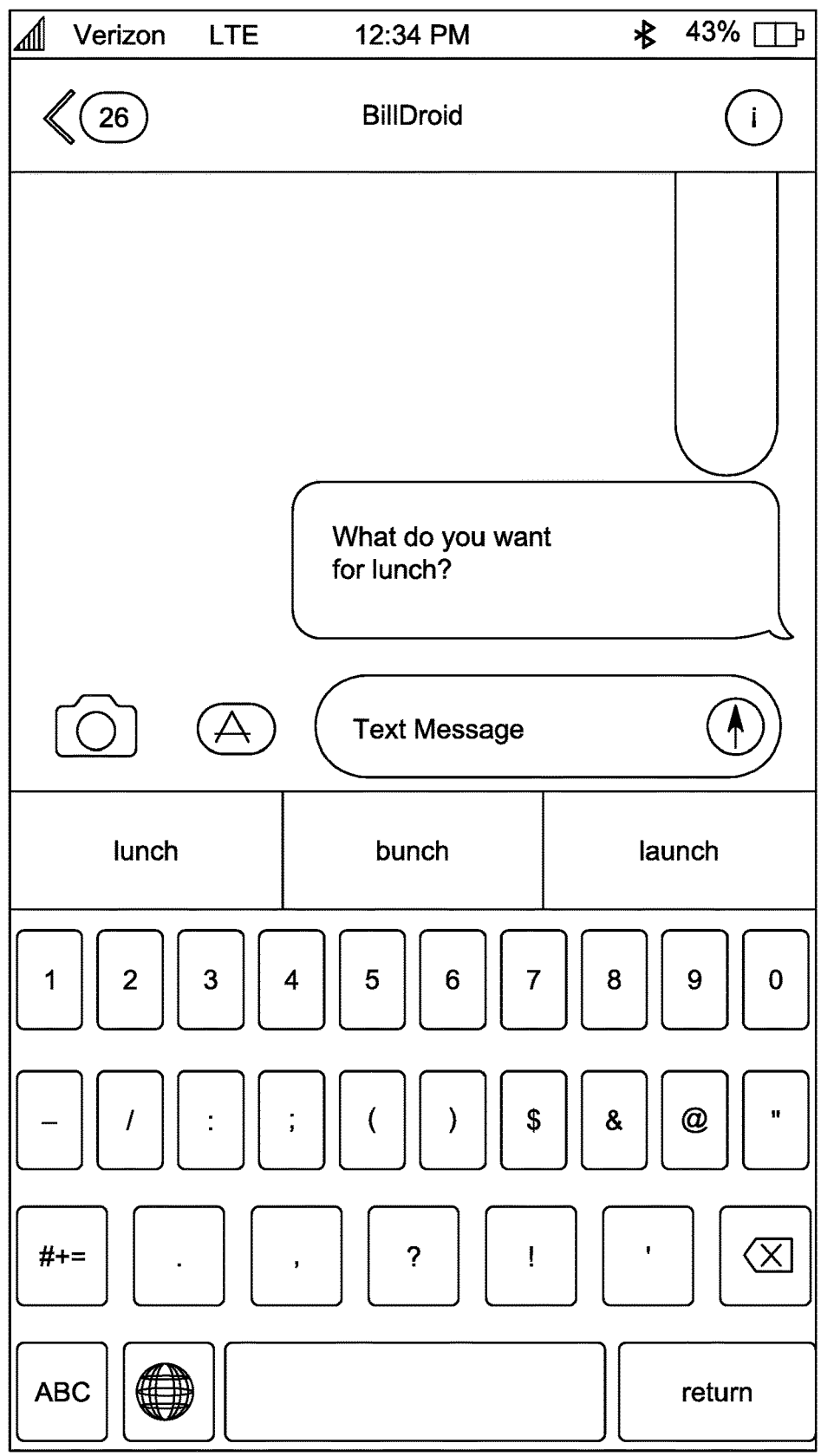

The client 502, 504 then receives the one or more offers in the form of, for example, an expandable ad unit, which may include a smaller base image (e.g., 75×50 pixels) and a larger banner image (e.g., 300×250 pixels). As illustrated in FIG. 6C, the base image, e.g., a McDonald's logo image 612 and/or a Subway logo image 614, is then displayed on the suggestion bar 610, signaling to the user of the keyboard extension application that an offer is available. This action may be referred to as the initiation process. If the end user taps on or selects the base image, the activation process takes place and the offer in the form of a banner or offer image, e.g., the McDonald's offer image 611 of FIG. 6D or the Subway offer image 613 of FIG. 6E, is presented in an overlay window on the keyboard extension application. The user may have the option to swipe the offer image, e.g., offer image 611 or 613, left to dismiss it, tap on, or select the offer image to apply the offer to a transaction, or swipe the offer image to the right to save it to the user's local wallet.

The session profiles are stored in the session database 516. As the client 502, 504 and the ad server 510 interact over time, the ad server 510 learns about the end users' preferences from the history of queries, include recent queries, made by the client 502, 504. The end user session profiles may then be used as input to the semantic engine 511 to adjust the offers being presented to the end user based on one or more of the keywords in the end user's messaging communications. This ensures, for example, that the end user does not repeatedly receive the same offer for which the end user has no interest. In embodiments, the systems of the present disclosure may include an end user profile database (not shown) which stores a unique profile for each end user. Each end user profile database may include end user preferences, such as, without limitation, the likes and dislikes of end users. The client 502, 504 may provide an interface through which end users can specify their preferences in their respective end user profiles. Additionally or alternatively, the server-side system may provide an interface through which an administrator or manager of the server-side system can specify end user preferences in end user profiles. In some embodiments, the semantic engine 511 may make associations between similar end user profiles and may present the same or similar offers to the end users with end user profiles that are similar or otherwise associated with each other.

In some exemplary embodiments, by examining an end users' inputs to the keyboard extension application and matching them against their end user profiles and against preferred product profiles, the semantic engine 511 understands that the end user prefers offers of certain types and/or is not interested in offers of other types across the many different types and categories of offers that are available.

The frequency of the offer is also a factor that the semantic engine 511 may consider in determining or selecting one or more appropriate offers for the ad server 510 to deliver to the client 502, 504. The client application may include a preference setting that enables the end user to set the frequency of offers.

The semantic engine 511 executes one or more algorithms including, for example, probability calculations, based on value-added data stored within one or more databases of the system (e.g., database 512) to improve ad or offer accuracy. For example, the semantic engine 511 determines user context to improve offer accuracy by passing a word or group of words output from the parser 506 through a refinement funnel or engine that uses one or more variables including, for example, location, demographics, communications history analysis, or common word pairing. This is accomplished by adding dimensions to a baseline of source offer data stored in database 512. The dimensions include at least one of conversational keyword targeting, geo targeting, time-of-day information, event information (e.g., eating food—breakfast, lunch, or dinner, or attending an entertainment event), or regional metadata about the source offer.

In embodiments, the systems and methods of this disclosure select and present real-time value offers to end users. In some embodiments, this may be accomplished by using the MySQL RDBMS Natural Language Query Mode extension. An extreme incremental value may be provided to partner publishers through adoption and integration of the keyboard extension application within the partner publisher applications. Exposing the enabled keyboard extension application to the partner publisher audiences enables the partner publishers to monetize their audiences more effectively. The value offers bring to both publishers and advertisers lies in the ability to engage with end users in real time and to present value offers to end users while they are having a text, email, or other electronic messaging conversation. In addition, the value that advertisers derive from the audiences stems from the available enhanced measurement metrics and improved directly attributable return on investment (ROI) for the advertisers' marketing campaigns.

Figure 7A:
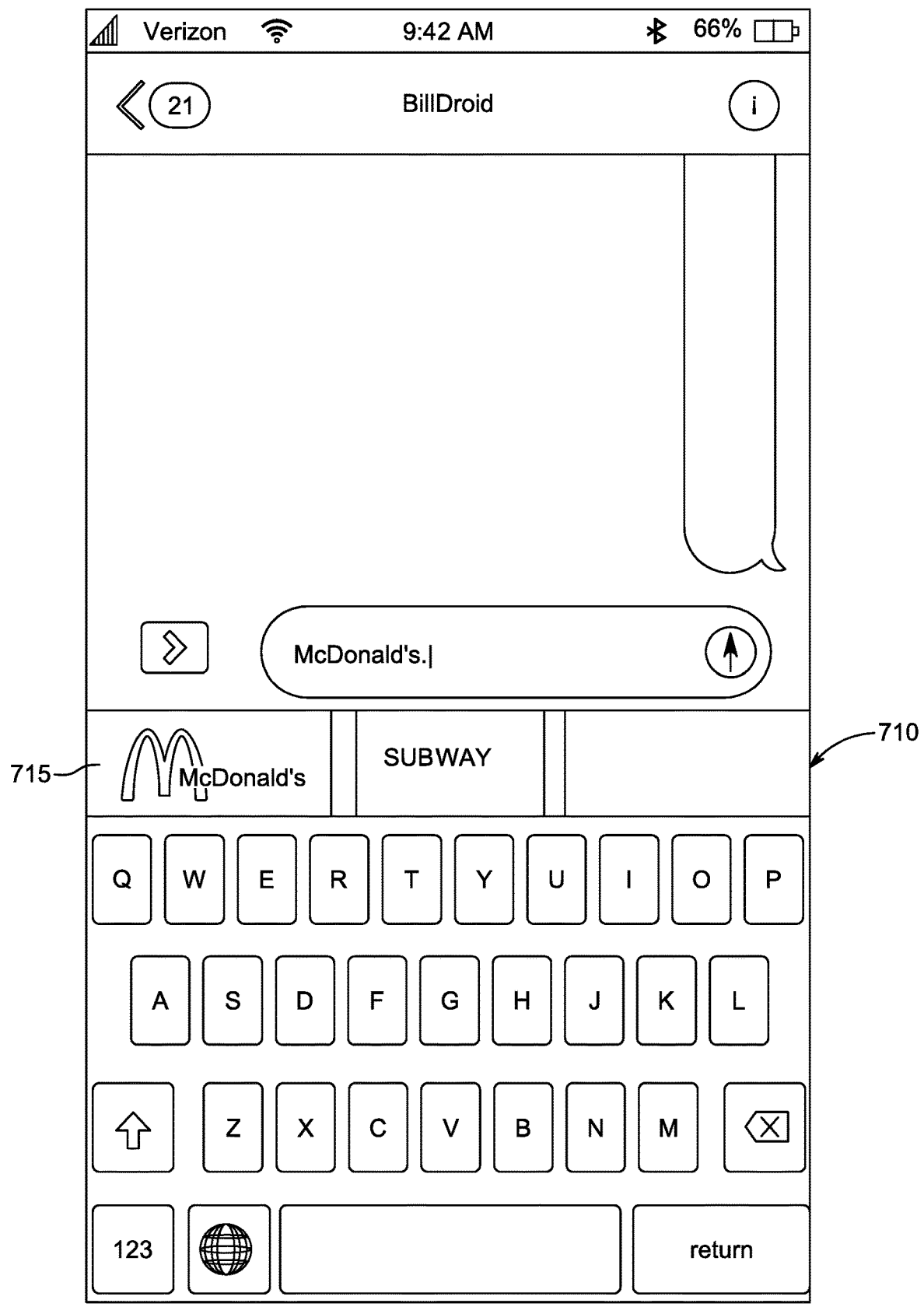
FIGS. 7A and 7B are illustrations of a computing device displaying situationally relevant information, in accordance with still other embodiments of this disclosure.
Figure 7B:
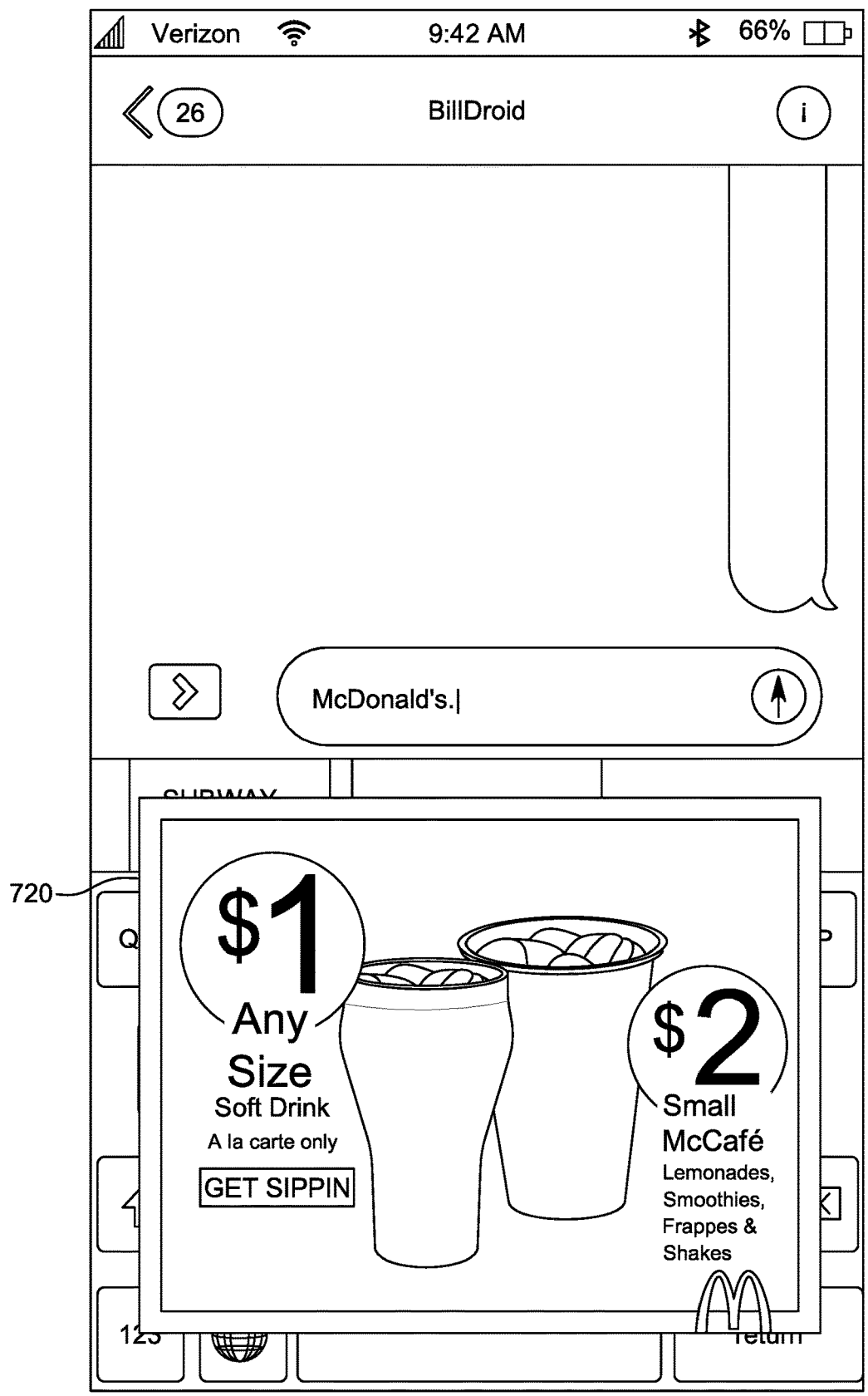

As illustrated in FIG. 7A, the logo images 715 on the suggestion bar 710 of the keyboard extension application may be converted into a digital billboard image 720 (FIG. 7B). The ability of an advertiser to make value offers to the end users of the keyboard extension application opens a new channel in the mobile digital media advertising technology ecosystem. Relevant value offers reward the end user, the publisher, and the advertiser, concurrently. FIG. 7B illustrates activation and presentation of an example offer image.

The client user interface design, e.g., for iOS and Android platforms, may include a single gesture swipe left to dismiss the offer or a swipe right to save the offer to the host application wallet. In embodiments, side-by-side competitive offers may be provided as illustrated in FIG. 7A. Alternatively, single brand offers may be made available to an advertiser if the advertiser does not wish to share space on the suggestion bar. The suggestion bar may be the ideal space for brands to associate and promote their products with multiple keywords or phrases input to the messaging window or field.

In embodiments, source offers 522, whether through a deal with a name brand merchant, directly sold through an ad agency, or through an affiliate program feed, may be input in the queue of the offer publishing system (OPS) 520 for proper processing and treatment. Source offers 522 may be provided electronically in a raw format, which the offer publishing system 520 processes to create a source offer that can be delivered by the ad server 510 to the client 502, 504. Some or all of the following operations are performed to cause the offer go live in the form of an ad campaign and delivered via the ad server 510. The source offer in the source offer input queue (which may also be referred to as the OPS pending queue) may take the form of an offer screen 900 illustrated in FIG. 9.

The offer screen 900 includes fields in which information and/or parameters regarding an offer may be input and/or selected, e.g., appropriate styling, keyword targeting, etc. The keyword targeting may include keywords that are typically used in conversational speech or in messaging applications. Once the fields in the offer screen 900 are completed, the publish button 905 may be selected to cause an OPS system or software program to compose the offer, populate the ad server 510, and set up a new campaign, which then goes live and is available to be trafficked. From this point on, the offer may be treated as a typical ad campaign delivered through any typical ad server, e.g., the ad server 510. Adjustments to the settings or parameters of the offer can then be made via an offer targeting console 515, such as time of day to serve the offer, a frequency cap to limit the number of times an offer will be shown to an end user, or a geo location target to limit where in the world the offer will be shown.

The offer screen 900 also includes a "Delete" button 910, which enables an administrator or manager of the server-side system to delete an offer from the source offer input queue 513 if the offer does not meet certain requirements. The requirements may include safety requirements to prevent offers having pornographic or violent material from being served by the ad server 510. In some embodiments, offers in the source offer input queue 513 may be manually reviewed or inspected by humans, a computer incorporating a suitable artificial intelligence system, or both (e.g., a human reviewer aided by a computer incorporating a suitable artificial intelligence system).

As offers are published, the associated product, brand, or merchant data may be retained in an archive within the database 512. In some embodiments, the product, brand, or merchant data may be retained in an archive within the database 512 even after the offer campaign has expired. In addition to the basic component parts of the offer as received from a merchant, the metadata associated and assigned by the offer publishing system 520 to the offer may be available for recall the next time an offer is made for the same product, merchant, or brand. Over time the database 512 may grow to include a wide range of offers spanning many popular categories that appeal to a growing audience of users. The retention of these offers and the ability to rank those offers by how well they resonate with audiences may guide the systems and methods of this disclosure to produce more of the types of specific offers individual and collective user groups wish to see. This type of closed loop feedback may lead to a database 512 with thousands of offers presented during cyclical times of the year, which may require minimal ongoing effort to publish. The database 512 may contain a growing reservoir of content with uniquely applied properties and dimensional data.

As the user audience grows so does the repository of commonly used text phrases. Thus, the profile database 514 and the session database 516 may grow into data warehouses, to which big data and analytics mining may be applied. Mapping phrases and keywords to the databases 514, 516 may provide additional intelligence to the semantic engine 511 so that the semantic engine 511 can determine, based on end user input to a keyboard extension application, appropriate offers for the end user with greater accuracy.

Figure 8:
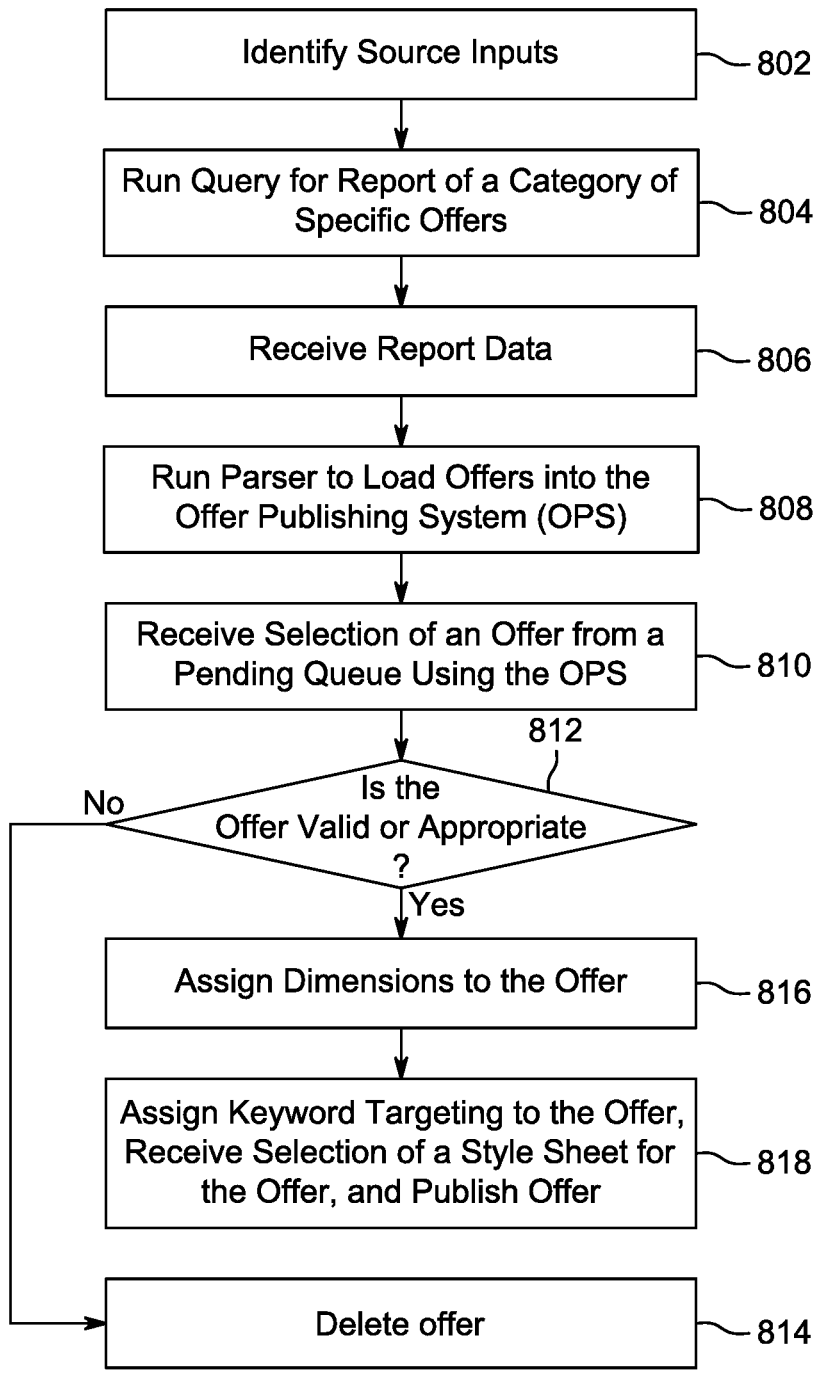
FIG. 8 is a flowchart showing an illustrative method for obtaining valid offer data, in accordance with embodiments of this disclosure.

FIG. 8 is a flow diagram of a method of preparing and processing offers according to embodiments of this disclosure. In block 802, source inputs are identified. Source inputs may be identified in affiliate networks, in directly-sold advertiser campaigns, and in third party ad serving networks. In block 804, a query is run for a report of a category of specific offers and, in block 806, report data is received, for example, in XML format. In block 808, the parser is run to load offers into the offer publishing system (OPS). In block 810, selection of an offer from a pending queue is received using the OPS.

In block 812, it is determined whether the offer is worthy or valid. If the offer is determined to be unworthy or invalid, the offer is deleted in block 814. If the offer is determined to be valid, worthy, or appropriate, dimensions are assigned to the offer in block 816. The dimensions may include targeting, keyword, geo location, time of day, region, and/or category. In block 818, keyword targeting is assigned to the offer, selection of a style sheet for the offer is received, and the offer is published. The offer may be produced by a campaign generator utility. Once the campaign is live, it is ready for use by the client side keyboard recall and initiation anytime the keyboard application is used by another application, a texting application, an email application, a calendar application, etc. At this point, the offer is ready for delivery to and real-time use by a mobile device, e.g., an iOS or Android smartphone or mobile phone.

Although illustrative embodiments of this disclosure have been described with reference to the accompanying drawings, it is to be understood that this disclosure is not intended to be limited to these precise embodiments, and that various changes and modification may be effected therein by one skilled in the art without departing from the scope or spirit of the disclosure.

What is claimed is:

1. A method of displaying offer data in response to receiving input on a mobile device, the method comprising:
    analyzing information input to an input field of a communications application to determine whether all or a portion of the information relates to one or more brands, merchants, products, or services;
    searching for offer data for the one or more brands, merchants, products, or services;
    displaying a suggestion bar associated with a virtual keyboard of the mobile device, the suggestion bar including a field displaying an object that identifies a merchant or a brand;
    in response to a first gesture to select the object, displaying an offer message of the merchant or the brand; and
    in response to a second gesture on the displayed offer message, dismissing the offer message or saving the offer message.

2. The method of claim 1, further comprising prioritizing the offer data based on one or more predefined rules.

3. The method of claim 2, wherein the predefined rules include a first rule which causes the offer data to be prioritized according to a relevance value.

4. The method of claim 3, wherein the predefined rules include a second rule which causes offer data having the same relevance value to be prioritized according to an auction.

5. The method of claim 2, wherein the predefined rules include a first rule which causes the offer data to be prioritized based on an auction.

6. The method of claim 1, wherein the mobile device is configured to receive text input via an input device,
    further comprising in response to receiving text input, transmitting the text input to a directed message server.

7. The method of claim 6, wherein the directed message server is configured to parse the text input received from the mobile device and generate a search query based on the parsed text input.

8. The method of claim 7, further comprising transmitting the search query to at least one content server and, in response to the transmitting, receiving at least one situationally relevant data element.

9. The method of claim 8, further comprising transmitting the at least one situationally relevant data element to the mobile device, the at least one situationally relevant data element having identifying information embedded therein.

10. The method of claim 9, further comprising:
    inputting identifying information into at least one merchant device; and
    transmitting, from the at least one merchant device to the directed message server, the identifying information associated with the at least one situationally relevant data element.

11. The method of claim 10, further comprising comparing the identifying information with a search query log,
    wherein the search query log includes records associated with search queries generated by the directed message server.

12. The method of claim 1, further comprising transmitting the text input to a messaging server after the offer message is displayed in response to receiving user selection of a send button.

13. The method of claim 1, wherein the offer message is displayed prior to transmitting the input information to a messaging server.

14. The method of claim 1, wherein the offer message is displayed over at least a large portion of a virtual keyboard space of the mobile device.

15. The method of claim 14, wherein the virtual keyboard space includes a suggestion bar space.

16. The method of claim 1, further comprising:
    determining whether the second gesture is a swipe gesture in a first direction or in a second direction;
    in response to determining that the swipe gesture is in the first direction, removing the offer message from a virtual keyboard space of the mobile device and saving the offer message in a virtual wallet; and
    in response to determining that the swipe gesture is in a second direction, removing the offer message from the virtual keyboard space without saving the offer message in the virtual wallet.

17. The method of claim 1, wherein the object includes a logo image.

18. A method of displaying offer data in response to receiving input on a mobile device, the method comprising:
    analyzing information input to an input field of a communications application to determine whether all or a portion of the information relates to one or more brands, merchants, products, or services;
    searching for offer data for the one or more brands, merchants, products, or services;
    displaying a suggestion bar associated with a virtual keyboard of the mobile device, the suggestion bar including a plurality of objects identifying a plurality of respective sources of the offer data resulting from the search;

in response to a first gesture to select a first object of the plurality of objects, displaying an offer message associated with the first object, the offer message expanding to fill a larger portion of a screen of the mobile device screen than the first object; and in response to a second gesture on the displayed offer message, dismissing the offer message or saving the offer message in a virtual wallet.

19. The method of claim 18, further comprising, in response to the first gesture to select the first object of the plurality of objects, removing the first object from the suggestion bar.

20. The method of claim 18, wherein the plurality of objects is displayed in the suggestion bar before the information input at an input field is transmitted.

* * * * *